(12) United States Patent
Cabral et al.

(10) Patent No.: US 11,967,014 B2
(45) Date of Patent: Apr. 23, 2024

(54) 3D CONVERSATIONS IN AN ARTIFICIAL REALITY ENVIRONMENT

(71) Applicant: Meta Platforms Technologies, LLC, Menlo Park, CA (US)

(72) Inventors: Brian Keith Cabral, San Jose, CA (US); Albert Parra Pozo, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/311,276

(22) Filed: May 3, 2023

(65) Prior Publication Data

US 2023/0267675 A1 Aug. 24, 2023

Related U.S. Application Data

(63) Continuation of application No. 17/688,023, filed on Mar. 7, 2022, now Pat. No. 11,676,330, which is a
(Continued)

(51) Int. Cl.
*G06T 15/20* (2011.01)
*G06F 3/16* (2006.01)
*H04N 7/15* (2006.01)

(52) U.S. Cl.
CPC .............. *G06T 15/20* (2013.01); *G06F 3/165* (2013.01); *H04N 7/157* (2013.01)

(58) Field of Classification Search
CPC .......... G06T 15/20; G06F 3/165; H04N 7/157
(Continued)

(56) References Cited

U.S. PATENT DOCUMENTS 9,244,588 B2 1/2016 Begosa et al.
9,303,982 B1 4/2016 Ivanchenko et al.
(Continued)

FOREIGN PATENT DOCUMENTS

WO 2020117657 A1 6/2020
WO 2021062278 A1 4/2021

OTHER PUBLICATIONS

Chen Z., et al., "Estimating Depth from RGB and Sparse Sensing," European Conference on Computer Vision (ECCV) 2018, Apr. 9, 2018, 22 pages.
(Continued)

*Primary Examiner* — Thomas J Lett
(74) *Attorney, Agent, or Firm* — Potomac Law Group, PLLC; Dannon G. Allbee

(57) ABSTRACT

A 3D conversation system can facilitate 3D conversations in an augmented reality environment, allowing conversation participants to appear as if they are face-to-face. The 3D conversation system can accomplish this with a pipeline of data processing stages, which can include calibrate, capture, tag and filter, compress, decompress, reconstruct, render, and display stages. Generally, the pipeline can capture images of the sending user, create intermediate representations, transform the representations to convert from the orientation the images were taken from to a viewpoint of the receiving user, and output images of the sending user, from the viewpoint of the receiving user, in synchronization with audio captured from the sending user. Such a 3D conversation can take place between two or more sender/receiving systems and, in some implementations can be mediated by one or more server systems. In various configurations, stages of the pipeline can be customized based on a conversation context.

20 Claims, 17 Drawing Sheets

Related U.S. Application Data continuation of application No. 16/935,093, filed on Jul. 21, 2020, now Pat. No. 11,302,063.

(58) Field of Classification Search
USPC ........................................................ 345/419
See application file for complete search history.

(56) References Cited

U.S. PATENT DOCUMENTS

| | | | |
|---|---|---|---|
| 9,841,814 | B1 | 12/2017 | Kallmeyer et al. |
| 9,959,676 | B2 | 5/2018 | Barzuza et al. |
| 10,298,587 | B2 | 5/2019 | Hook et al. |
| 10,499,033 | B2 | 12/2019 | Pesonen |
| 10,554,931 | B1 | 2/2020 | Zavesky et al. |
| 10,582,191 | B1 | 3/2020 | Marchak, Jr. et al. |
| 10,952,006 | B1 | 3/2021 | Krol et al. |
| 11,055,514 | B1 | 7/2021 | Cao et al. |
| 11,138,780 | B2 | 10/2021 | Lee |
| 11,140,361 | B1 | 10/2021 | Krol et al. |
| 2002/0158873 | A1 | 10/2002 | Williamson |
| 2003/0037109 | A1 | 2/2003 | Newman et al. |
| 2008/0012936 | A1 | 1/2008 | White |
| 2011/0107270 | A1 | 5/2011 | Wang et al. |
| 2012/0131478 | A1 | 5/2012 | Maor et al. |
| 2015/0279044 | A1 | 10/2015 | Kim et al. |
| 2015/0317832 | A1 | 11/2015 | Ebstyne et al. |
| 2016/0210780 | A1 | 7/2016 | Paulovich et al. |
| 2017/0068551 | A1* | 3/2017 | Vadodaria ............ G06Q 10/107 |
| 2017/0083754 | A1 | 3/2017 | Tang et al. |
| 2018/0070115 | A1 | 3/2018 | Holmes |
| 2018/0101989 | A1 | 4/2018 | Frueh et al. |
| 2018/0144212 | A1 | 5/2018 | Burgos et al. |
| 2018/0158246 | A1 | 6/2018 | Grau et al. |
| 2018/0234671 | A1 | 8/2018 | Yang et al. |
| 2019/0042832 | A1 | 2/2019 | Venshtain |
| 2019/0045157 | A1 | 2/2019 | Venshtain et al. |
| 2019/0058870 | A1 | 2/2019 | Rowell et al. |
| 2019/0346522 | A1 | 11/2019 | Botnar et al. |
| 2019/0371279 | A1 | 12/2019 | Mak |
| 2020/0090350 | A1 | 3/2020 | Cho et al. |
| 2020/0117267 | A1 | 4/2020 | Gibson et al. |
| 2020/0118342 | A1 | 4/2020 | Varshney et al. |
| 2020/0142475 | A1 | 5/2020 | Paez et al. |
| 2020/0279411 | A1 | 9/2020 | Atria et al. |
| 2020/0371665 | A1 | 11/2020 | Clausen et al. |
| 2021/0019541 | A1 | 1/2021 | Wang et al. |
| 2021/0165492 | A1 | 6/2021 | Ohashi |
| 2021/0192852 | A1 | 6/2021 | Holmes |
| 2021/0248727 | A1 | 8/2021 | Fisher et al. |
| 2021/0263593 | A1 | 8/2021 | Lacey |
| 2021/0287430 | A1 | 9/2021 | Li et al. |
| 2021/0358212 | A1 | 11/2021 | Vesdapunt et al. |
| 2021/0390767 | A1 | 12/2021 | Johnson et al. |
| 2022/0413434 | A1 | 12/2022 | Parra Pozo et al. |

OTHER PUBLICATIONS

Croitoru I., et al., "Unsupervised Learning of Foreground Object Segmentation," International Journal of Computer Vision (IJCV), May 13, 2019, vol. 127, No. 9, May 13, 2019, 24 pages.

Frueh C., et al., "Headset removal for virtual and mixed reality," ACMSIGGRAPH Talks, 2017, 2 pages.

Gupta K., et al., "Do You See What I See? The Effect ofGaze Tracking on Task Space Remote Collaboration," IEEE Transactions onVisualization and Computer Graphics, Nov. 2016, vol. 22, No. 11, pp. 2413-2422, DOI: 10.1109/TVCG.2016.2593778.

International Search Report and Written Opinion for International Application No. PCT/US2021/038992, dated Oct. 29, 2021, 16 pages.

International Search Report and Written Opinion for International Application No. PCT/US2022/031497, dated Sep. 29, 2022, 11 pages.

International Search report and Written Opinion for International Application No. PCT/US2022/039453, dated Nov. 29, 2022, 16 pages.

Kuster C., et al., "Towards Next Generation 3D Teleconferencing Systems," 2012 3DTV-Conference: The True Vision—Capture, Transmission, and Display of 3D Video (3DTV-CON), Oct. 15, 2012, pp. 1-4.

Unknown., "A Better Way to Meet Online," Gather, https://www.gather.town/ , Last Accessed Oct. 11, 2021.

Wei S. E., et al., "VR Facial Animation via Multiview Image Translation," ACM Transactions on Graphics (TOG), 2019, vol. 38, No. 4, pp. 1-16.

Wilson A.D., "Fast Lossless Depth Image Compression," Proceedings of the 2017 ACM International Conference on Interactive Surfaces and Spaces, Oct. 17, 2017, pp. 100-105.

Yang B., et al., "3D Object Reconstruction from a Single Depth View with Adversarial Learning," Proceedings of the IEEE International Conference on Computer Vision Workshops, 2017, pp. 679-688.

Huynh D., et al., "A Framework for Cost-Effective Communication System for 3D Data Streaming and Real-Time 3D Reconstruction," Interactive and Spatial Computing, Apr. 12, 2018, 9 pages.

International Search Report and Written Opinion for International Application No. PCT/US2023/010369, mailed Apr. 28, 2023, 15 pages.

* cited by examiner

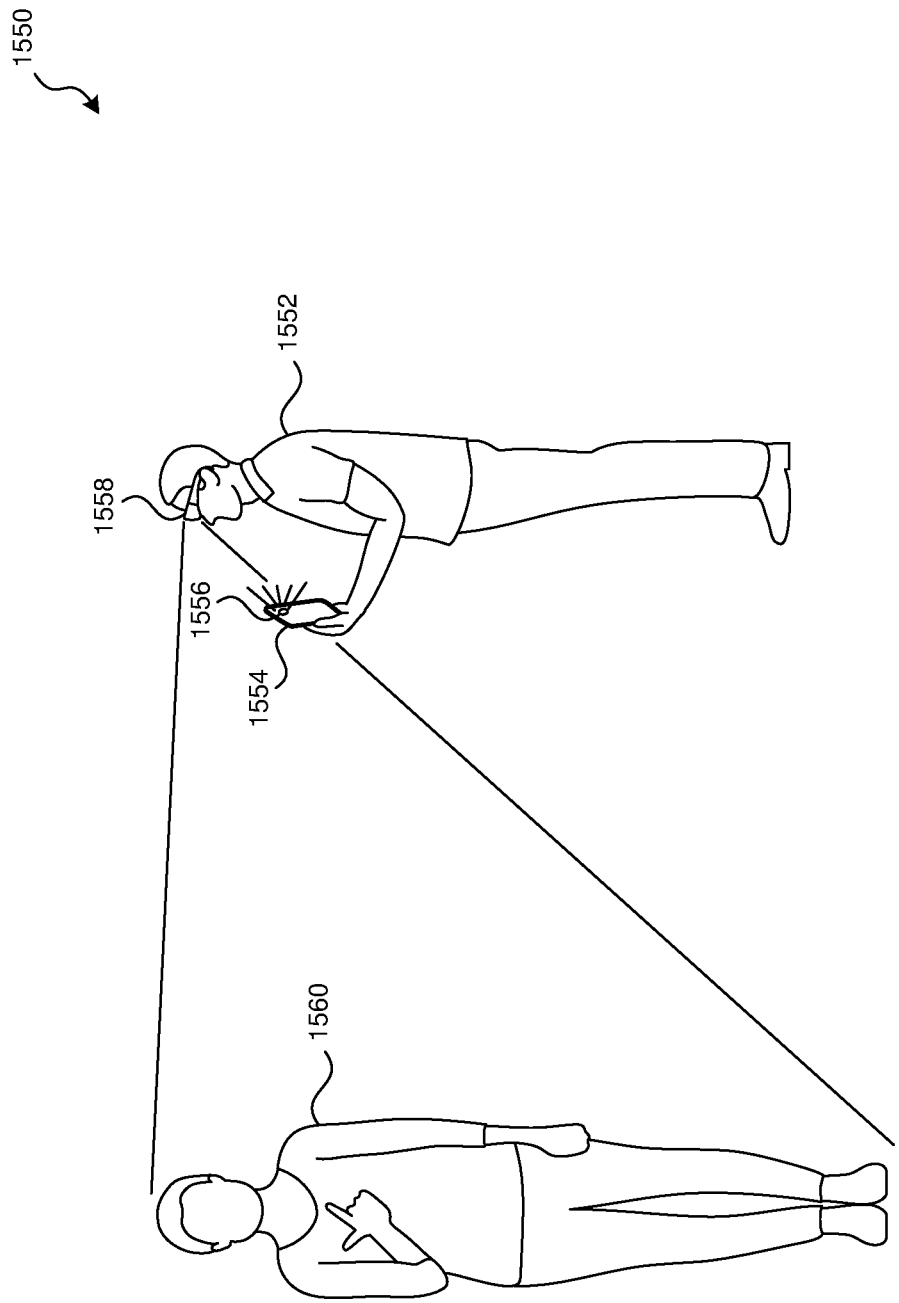

3D CONVERSATIONS IN AN ARTIFICIAL REALITY ENVIRONMENT

CROSS-REFERENCE TO RELATED APPLICATIONS

This application is a continuation of U.S. application Ser. No. 17/688,023, filed Mar. 7, 2022, titled "3D Conversations in an Artificial Reality Environment," currently pending, which is a continuation of U.S. application Ser. No. 16/935,093, filed Jul. 21, 2020, title "3D Conversations in an Artificial Reality Environment," now U.S. Pat. No. 11,302,063, issued on Apr. 12, 2022, both of which are herein incorporated by reference in their entirety.

TECHNICAL FIELD

The present disclosure is directed to aspects of a communication pipeline between multiple devices for implementing three-dimensional ("3D") conversations.

BACKGROUND

Video conferencing has become a major way people connect. From work calls to virtual happy hours, webinars to online theater, people feel more connected when they can see other participants, bringing them closer to an in-person experience. Such video calls, however, remain a pale imitation of face-to-face interactions. Understanding body language and context can be difficult with only a two-dimensional ("2D") representation of a sender. Further, communication often relies on interpersonal interactions, such as spatial movements between participants. Yet communication over video calling does not provide the ability for participants to move relative to each other, as the point of view is fixed to the sender's camera. In addition, the limitation of video calling on a flat panel display introduces an intrusive layer of technology that can distract from communication and diminishes the perception of in-person communication.

BRIEF DESCRIPTION OF THE DRAWINGS

FIG. 15B is a conceptual diagram illustrating the example 3D conversation of FIG. 15A, from a second system perspective in an artificial reality environment.

The techniques introduced here may be better understood by referring to the following Detailed Description in conjunction with the accompanying drawings, in which like reference numerals indicate identical or functionally similar elements.

DETAILED DESCRIPTION

Figure 1:
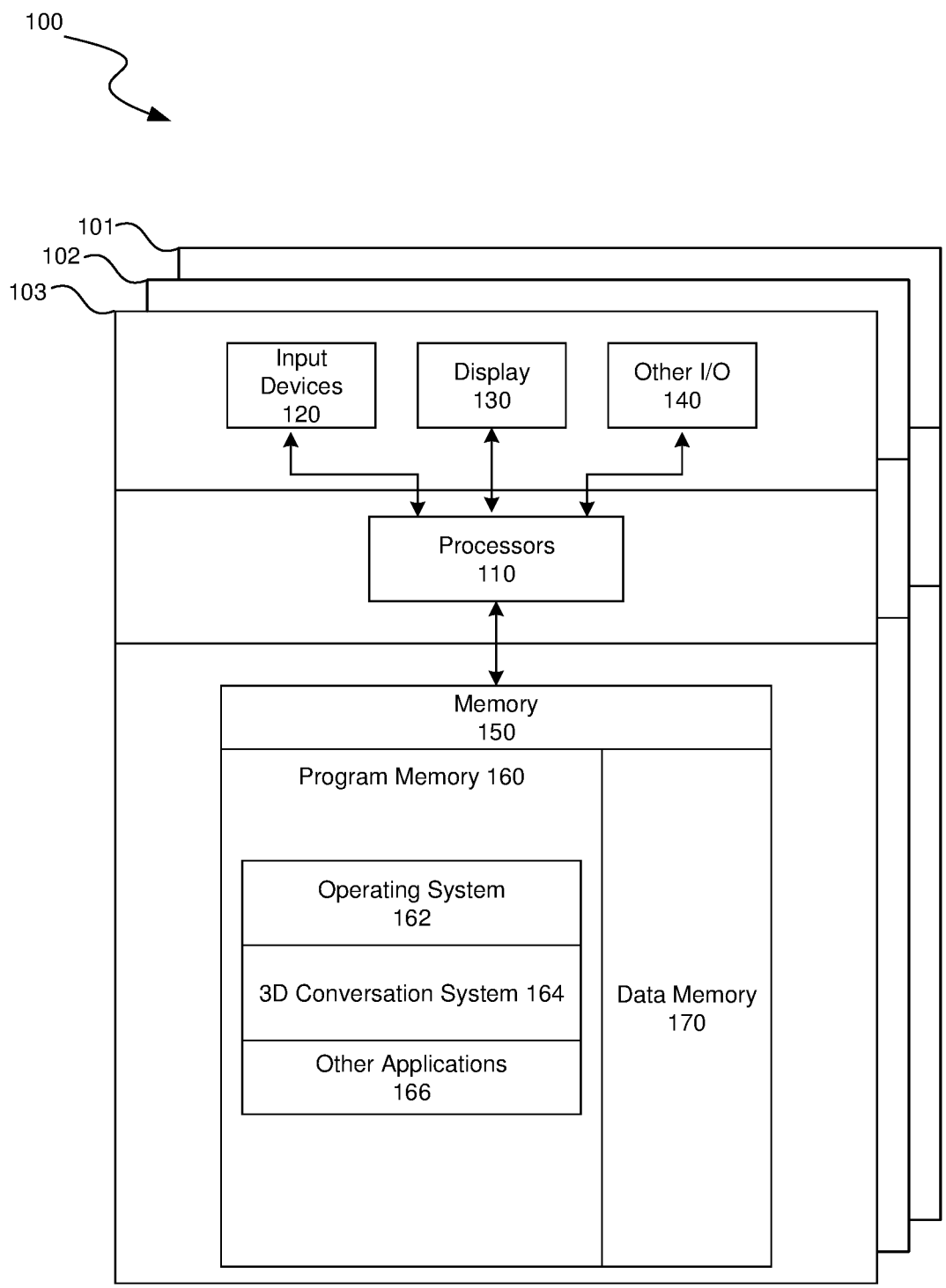
FIG. 1 is a block diagram illustrating an overview of devices on which some implementations of the present technology can operate.

Aspects of the present disclosure are directed to 3D conversations in an augmented reality environment, allowing users to have a conversation while appearing as if they are face-to-face in 3D space. A 3D conversation system can accomplish this by implementing a pipeline of data processing stages, which can include one or more of the following: calibrate, capture, tag and filter, compress, decompress, reconstruct, render, and display. Generally, the pipeline can capture images of the user of a first device (a "sending user"), create intermediate representations, transform the representations to convert from the orientation the images were taken from to a viewpoint of a user of a second device (a "receiving user"), and output images of the sending user from the viewpoint of the receiving user. In some implementations, this pipeline can be performed, for example, with a 100 ms latency or less.

A 3D conversation can take place between two or more sender/receiving systems and, in some implementations, can be mediated by one or more server systems. In various configurations, stages of the pipeline can be performed on different ones of these systems and/or stages can be dynamically performed on different systems based on a "conversation context". A conversation context can include any available contextual information of the conversation such as available resources (sender and/or receiver processing capacity, bandwidth, a remaining battery level, etc.), capture and/or display capabilities of the sender and/or receiver, user settings, receiver viewpoint, sender camera positions, etc.

The capture stage can include the capture of audio, traditional images, and/or depth data by one or more capture devices of a sender 3D conversation system. In various implementations, the captured depth data can include distance data (i.e., for each pixel, the distance between the lens and the object depicted in that pixel, e.g., in a depth image), a point cloud (i.e., a set of points defined in 3D space), a light field (i.e., one or more vectors that describe the amount of light flowing in various directions for various points in space), or another depiction of 3D space. In various implementations, multiple capture devices can be available to the sender 3D conversation system, and which devices are used to capture data can be based on a conversation context, such as available bandwidth, a configuration of a receiving 3D conversation system, a viewpoint of a receiving user, etc. The captured data can be initially tagged with meta-data such as time of capture and with an identifier of the device that captured it. Additional capture stage details are discussed below in relation to block 436 of FIG. 4, block 504 of FIG. 5, and FIG. 8.

The tag and filter stage can include various processes to tag the captured data with further meta-data, improve the quality of captured data, and/or remove unnecessary portions of the captured data. The captured data can be tagged with calibration data generated at the calibration stage (discussed below) signifying intrinsic and extrinsic parameters (e.g., a camera position and orientation, camera geometries, etc.), objects or people identified in sequences of the images, the areas of images showing identified objects or people, results of analysis (e.g., adding a user skeleton view), video motion characteristics, etc. Various captured data streams can also be cross-augmented by using multiple related video streams to enhance each other. For example, where color images and depth images are taken from similar positions, the color image data and depth image data can be cross-applied between the data streams to enhance each other. Finally, portions of the images can be removed, such as the background of the user. Additional tag and filter stage details are discussed below in relation to block 438 of FIG. 4, block 506 of FIG. 5, and FIG. 9.

The compression stage can transform the captured data into a format for transmission across a network (e.g., by applying a video codec or other compression algorithm) and the decompression stage can transform the compressed data back to a version (e.g., via lossy or lossless compression) of the original data (e.g., back into individual images or videos, point clouds, light fields, etc.). In various implementations, the meta-data tagged to the various data streams can be encoded into the compressed video stream or can be provided as separate associated data. Additional compression stage and decompression stage details are discussed below in relation to blocks 440 and 442 of FIG. 4, blocks 508 and 510 of FIG. 5, and FIGS. 10 and 11.

The reconstruction stage can create a 3D representation of the sending user. The reconstruction stage can perform this transformation of the captured depth data into a 3D representation such as a point cloud, a signed distance function, populated voxels, a mesh, a light field, etc., using the calibration data to combine data from multiple sources and/or transform the captured data into position and contour information in 3D space. For example, each pixel in a depth image depicting a user can be transformed into a 3D representation of at least part of the user by applying transformations based on the intrinsic and extrinsic properties of the camera. The transformations can take each pixel taken at the camera location and determine a corresponding point in 3D space representing a point on the surface of the user. In some implementations, the reconstruction stage can also apply shading or color data to the 3D representation based on the calibration data. In some cases, the reconstruction process can be customized based on the computational and display characteristics of the receiving 3D conversation system. In some implementations, the 3D representation can include portions that are not direct translations of captured data, e.g., for portions of the user that were not depicted in the captured data. These portions can be e.g., avatar representations, machine learning estimations of the missing portions, or previously captured versions of the missing portions. Additional reconstruction stage details are discussed below in relation to block 444 of FIG. 4, block 512 of FIG. 5, and FIG. 12.

The render stage can generate one or more 2D images from a viewpoint of the receiving user based on the 3D representation generated by the reconstruction stage. While displayed to the receiving user as 2D images (unless the receiving user has a true 3D display), these can appear to the receiving user to be a 3D representation of the sending user. These images can be generated to meet the display properties of the receiving system, e.g., to match resolution, display size, or display type of the receiving system. For example, where the receiving system is an artificial reality system with a display for each eye, the render stage can generate an image from the viewpoint of each eye at the resolution of these displays. In various implementations, the render stage can generate a single image, two "stereo" images, a light field, etc. In some implementations, the render stage can transform captured color data and apply it to the rendered images. Additional render stage details are discussed below in relation to block 446 of FIG. 4, block 514 of FIG. 5, and FIG. 13.

The display stage can receive the rendered one or more 2D images and output them via display hardware of the receiving system. For example, the display stage can display the image(s) on a screen, project them onto a "virtual cave" wall, project them into a user's eye, etc. The display stage can also synchronize display of the 2D images with output of corresponding audio. Additional display stage details are discussed below in relation to block 448 of FIG. 4, block 516 of FIG. 5, and FIG. 14.

An additional calibration stage can be also be included in the pipeline which, in various implementations, can be performed as a pre-stage to the 3D conversation (e.g., an automatic or manual process partially or completely performed by a system administrator, manufacturer, or a user) and/or can be performed "online" as the 3D conversation takes place. The calibration stage can gather intrinsic and extrinsic properties of cameras that are part of a sending system. Intrinsic parameters can specify features of a camera that are internal (and often generally fixed) for a particular camera. Examples of intrinsic parameters include focal length, a relationship between a pixel coordinates, lens geometric distortion, etc. These parameters can characterize the optical, geometric, and digital characteristics of the camera, allowing a mapping between camera coordinates and pixel coordinates of an image. Extrinsic parameters can specify conditions or context external to the camera. Examples of extrinsic parameters include the location and orientation of the camera, ambient conditions (e.g., heat, moisture, etc.), lighting characteristics (e.g., lighting source location, type, orientation), etc. These parameters can be used to characterize light received at each camera pixel, allowing that light to be interpreted in terms of a 3D environment. Each camera used by the 3D conversation system can be individually calibrated and associated with resulting calibration meta-data. Additional calibration stage details are discussed below in relation to block 434 of FIG. 4, block 502 of FIG. 5, and FIG. 7.

The 3D conversation pipeline can be implemented using different combinations of 2D display devices, 3D display devices, and/or intermediate devices. Examples of 2D display devices include PCs, mobile devices (e.g., phones, tablets, watches, etc.), televisions, or other traditional display screen technology. Examples of 3D display devices include mixed reality glasses, virtual reality headsets, laser plasma displays, projection caves, etc., which may include wireless or wired external compute sources. In various implementations, the display devices can include one or more displays such as at least one binocular display, at least one lightfield display, at least one holographic display, at least one wave front display, at least one 3D stereo displays, or any combination thereof. In some implementations, different types of devices (2D and/or 3D) can communicate with each other using the 3D conversation pipeline. In various implementations, 3D conversations using the 3D conversation pipeline can be between two or more devices that each act as sender devices for capturing images of users of that device and receiver devices for receiving representations of each of the other one or more participants of the conversation.

In some implementations, the 3D conversation pipeline is performed without utilizing servers for anything other than traditional communication (e.g., over the Internet), while in other implementations, a server or other cloud computing system can perform certain stages such as reconstruction, rendering, or parts of calibration. For example, the reconstruction stage for a 3D conversation involving three participants can be at a server that compiles the captured image data from the participants into a single 3D representation of each of the participants. As another example, an intermediate server might perform part of the filtering stage, whereby the viewpoints of the various participants are tracked in a 3D environment and used to determine which portions of the captured data from each other participant is needed for a recipient device to perform reconstruction and rendering for that viewpoint. Additional details for various pipeline configurations using different devices for different stages are discussed below in relation to FIG. 6.

In various implementations, the 3D pipeline as a whole or configurations of various stages can be smoothly adjusted to upgrade or downgrade features according to a conversation context (e.g., based on processing or other computing resources available at the various devices, display capabilities of the various devices, available bandwidth, user preferences, etc.) For example, frame rates or resolution can be adjusted, 3D contouring (e.g., number of triangles used) can be adjusted, portions of images can be predicted using machine learning or based on previously captured data rather than being wholly representative of current captured data, portions of images can be replaced with avatar representations, or the conversation can be converted to a 2D or audio only version.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

While there are existing visual communication systems, they fail to enable communications comparable to in-person interaction. For example, existing video calling systems limit how much body language can be perceived, fail to provide the ability for users to move relative to each other, and introduce an intrusive layer of technology that can distract from the communication and diminish the perception of in-person communication. In addition, existing systems for providing interactions in 3D environments, such as in virtual reality chat rooms, are very computationally expensive and fail to accurately depict the communication participants. The pipeline of data capture and manipulation stages in the 3D conversation systems and processes described herein are expected to overcome these problems associated with conventional video and 3D interaction techniques and are expected to reduce computational requirements of 3D communication while providing more realistic interactions. Furthermore, by including multiple static customizations and/or dynamic, context-based selections of pipeline stages and stage configurations, the 3D conversation system can operate with devices of many more processing and display capabilities and with many more bandwidth availabilities than the existing systems. In addition, while the disclosed 3D conversation systems provide a result comparable to an in-person experience, the processes and systems to achieve this result are not analogs of existing communication techniques, but instead introduce completely new ways of organizing data capture and processing steps. For example, the existing video calling techniques use capture and compression, but do not incorporate 3D reconstructions. Further, existing 3D interaction systems fail to provide the fidelity and resource conservation offered by the disclosed 3D conversation system.

Several implementations are discussed below in more detail in reference to the figures. FIG. 1 is a block diagram illustrating an overview of devices on which some implementations of the disclosed technology can operate. The devices can comprise hardware components of a computing system 100 that implements a 3D conversation pipeline including capture, tag and filter, compression, decompression, reconstruction, render, and display stages. This pipeline enables communications across a network that resemble in-person interactions, while being operable with relatively low processing capabilities and in low bandwidth environments. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, 3D conversation system 164, and other application programs 166. Memory 150 can also include data memory 170, which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
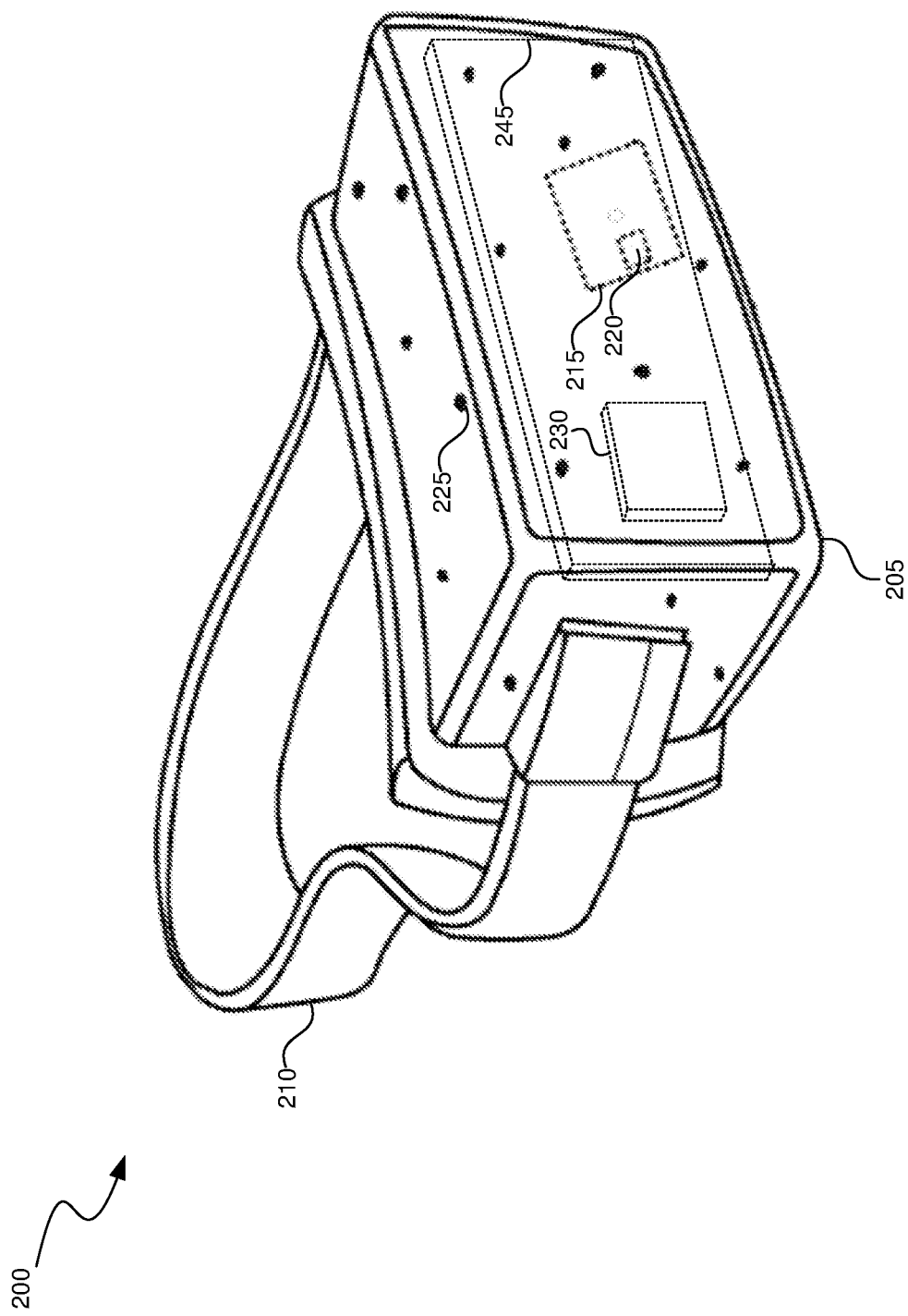
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
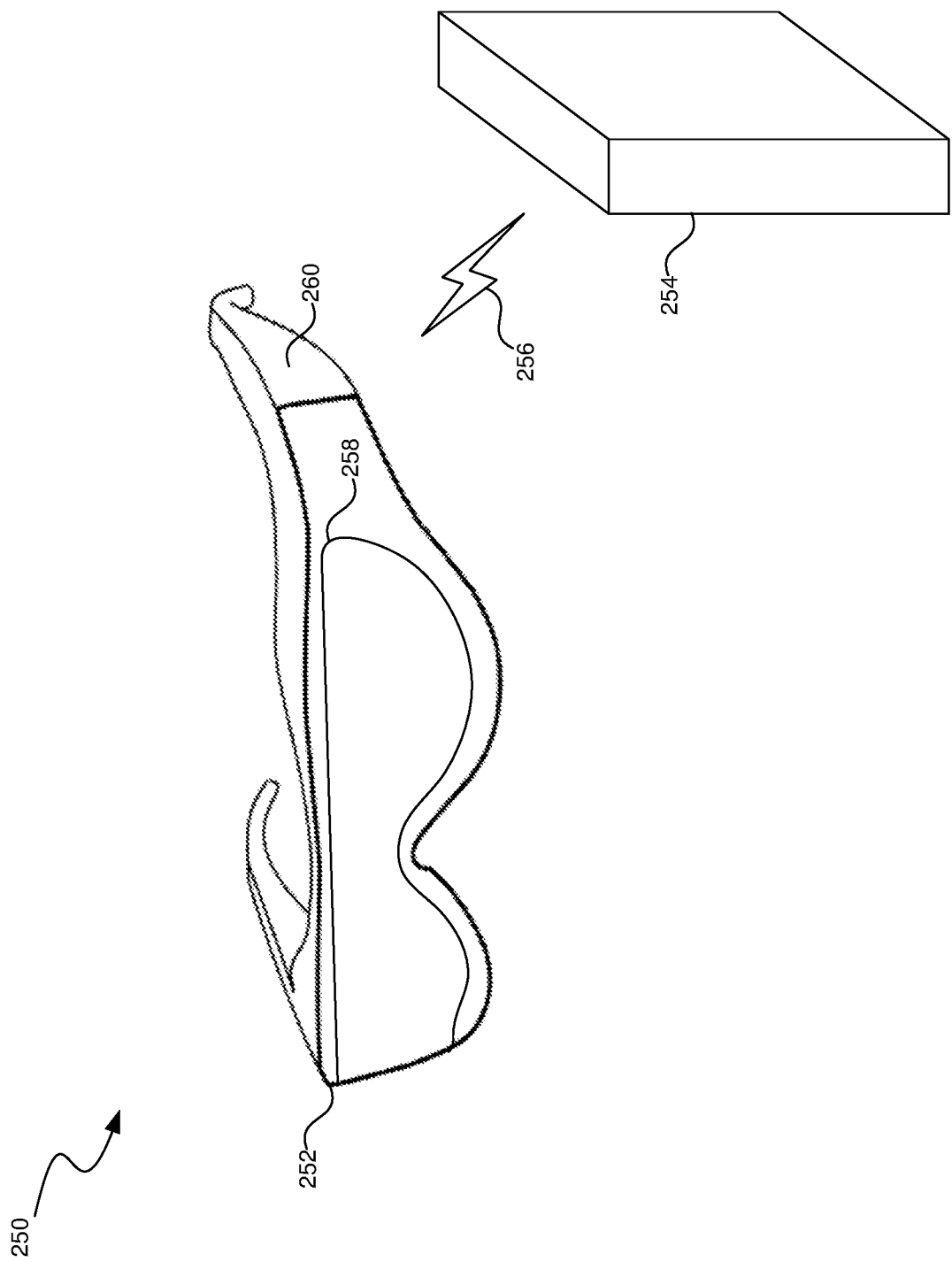
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
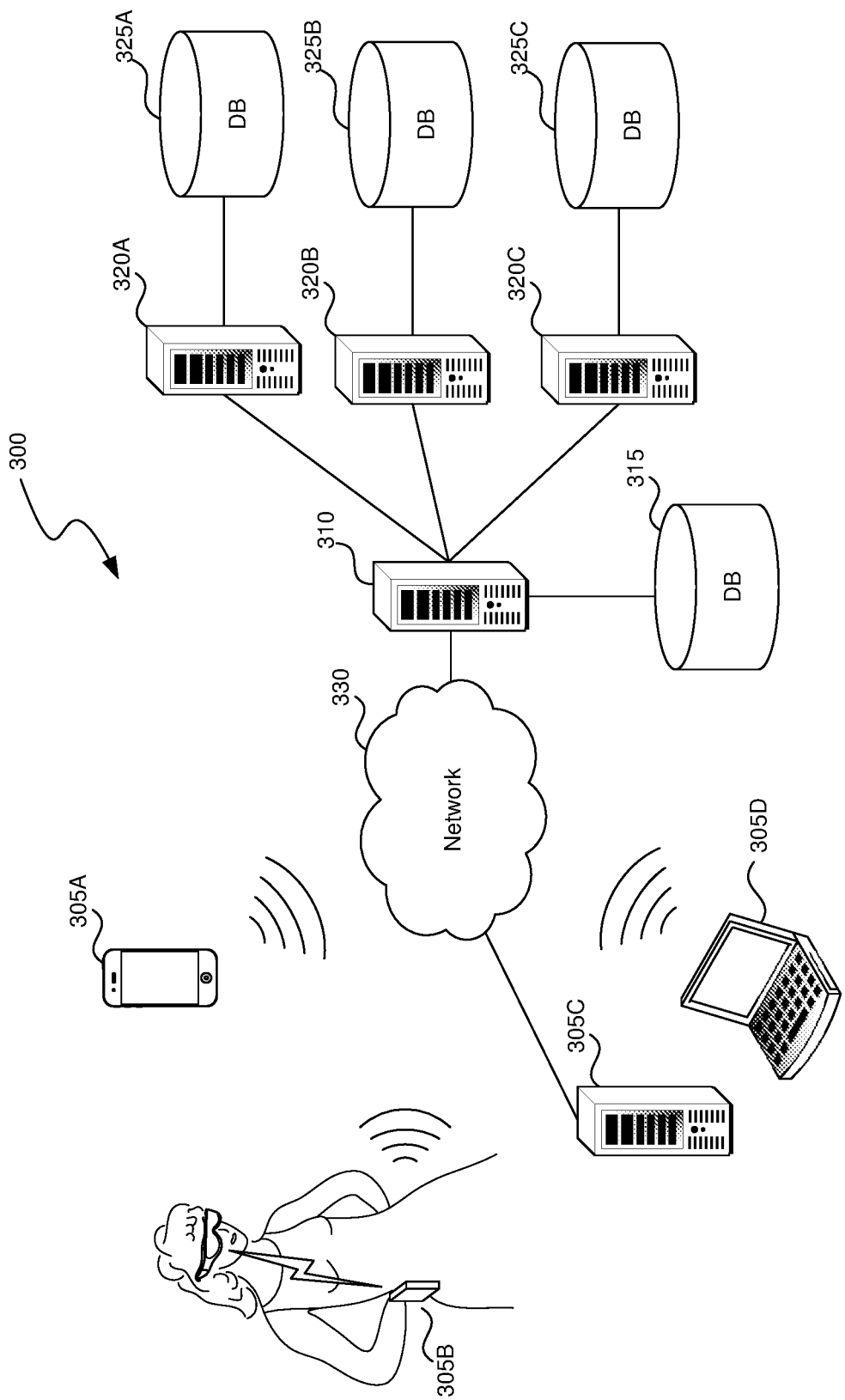
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
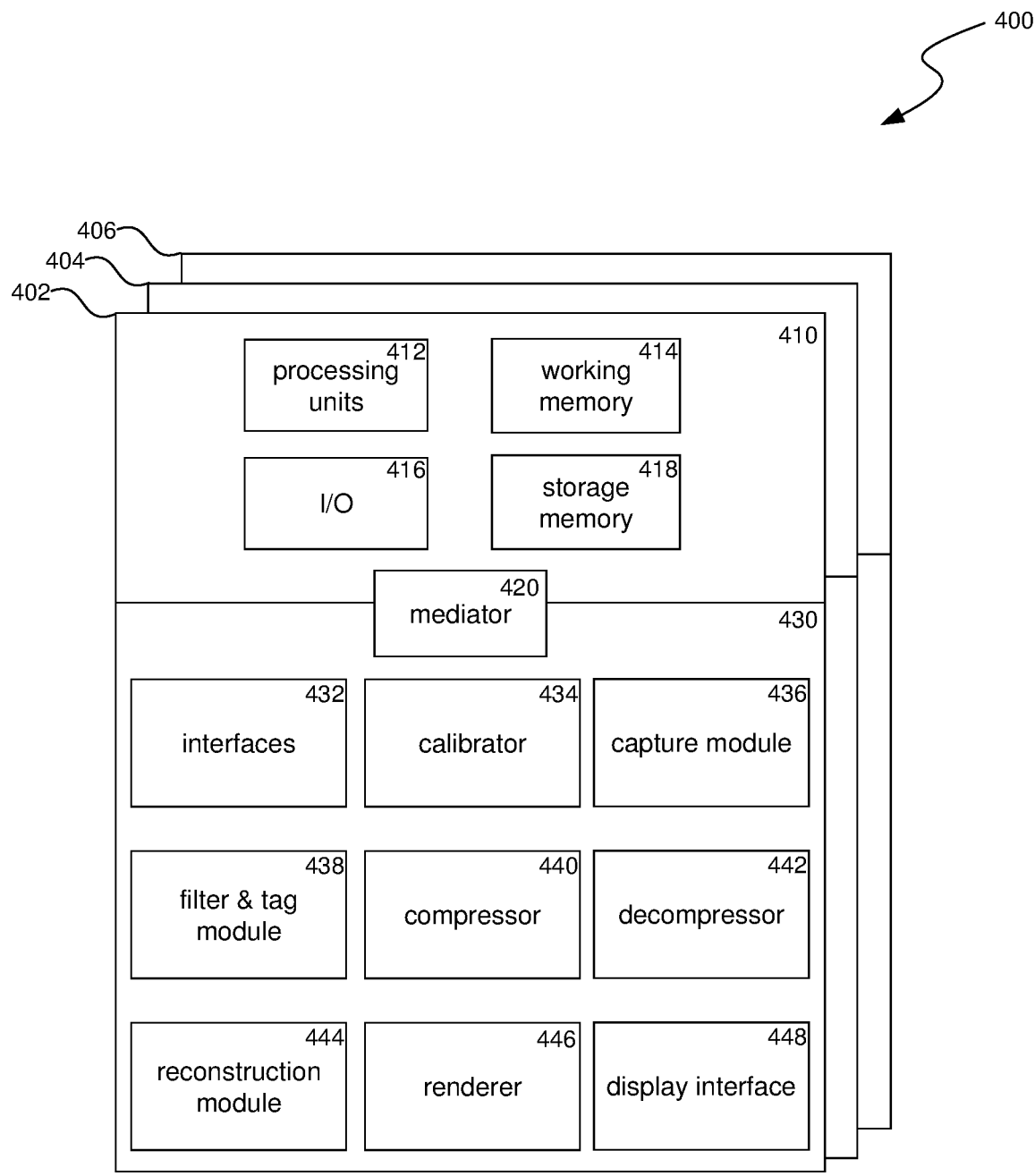
FIG. 4 is a block diagram illustrating components which, in some implementations, can be used in a system employing the disclosed technology.

FIG. 4 is a block diagram illustrating systems 400 which, in some implementations, can be used in deploying the disclosed technology. Various components from components 410, 420, and/or 430 can be included in one device of computing system 100, or can be distributed across multiple of the devices of computing system 100 (e.g., as separate systems 402-406). For example, when a 3D conversation pipeline is formed between systems 402, 404, and 406 and each system is a participant in the conversation (sender and receiver), a version of each of components 434-448 can be included in each system 402, 404, and 406. In other implementations, where a server (e.g., system 404) acts an intermediary between one or more conversation participants, one or more of the components 438-446 can be implemented on that server system. In some implementations, versions of one or more of the components 434-448 can be on multiple of the conversation participant systems and/or server system while in other implementations, one or more of the components 434-448 can exist on only one of the multiple of the conversation participant systems and/or server system. In various implementations, components 410-430 can be implemented in a client computing device such as one of client computing devices 305 or on a server computing device, such as one of server computing devices 310 or 320 (FIG. 3).

System 402 includes hardware 410, mediator 420, and specialized components 430. As discussed above, a system implementing the disclosed technology can use various hardware including processing units 412, working memory 414, input and output devices 416 (e.g., traditional cameras, depth cameras, display systems, IMU units, network connections, sensors, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be an interface to a cloud storage provider (such as in storage 315 or 325) or other network storage accessible via one or more communications networks.

Mediator 420 can include components that mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for implementing part of a 3D conversation pipeline. Specialized components 430 can include one or more of the following: calibrator 434, capture module 436, filter and tag module 438, compressor 440, decompressor 442, reconstruction module 444, renderer 446, display interface 448, and components and APIs that can be used for providing user interfaces, transferring data, and controlling the specialized components, such as interfaces 432. Although depicted as separate components, specialized components 430 may be logical or other nonphysical differentiations of functions and/or may be submodules or code-blocks of one or more applications.

Calibrator 434 can generate calibration data for capture devices. Calibration data can include, for example, intrinsic parameters, extrinsic parameters, and noise characteristics. Intrinsic parameters can specify features of a camera that are internal (and often are generally fixed) for a particular camera. Intrinsic parameters can characterize the optical, geometric, and digital characteristics of the camera, allowing a mapping between camera coordinates and pixel coordinates of an image. Extrinsic parameters can specify conditions or context external to the camera. Extrinsic parameters can be used to characterize light received at each camera pixel, allowing that light to be interpreted in terms of a 3D environment. Various parts of the calibration data can be generated at different points, e.g., by a manufacturer, during an initial system configuration, or during use of the cameras. The calibration data can be stored in association with particular capture devices for which the calibration data was generated, e.g., in storage memory 418, or in memory of that capture device of I/O devices 416. Additional details on generating calibration data are discussed below in relation to block 502 of FIG. 5 and FIG. 7.

Capture module 436 can interface with capture devices (of I/O devices 416) to obtain captured data streams, e.g., traditional images, depth images or other depth data, and/or audio data. Capture module 436 can tag this received data with indicators of the device that captured each part of the data and the time the data was captured. Additional details on capturing data are discussed below in relation to block 504 of FIG. 5 and FIG. 8.

Filter and tag module 438 can receive captured data from capture module 436 and can apply filters, enhancements, and/or tags to the captured data. Examples of filters that can be applied include removing of backgrounds or other parts of images that do not depict the sending user and removal of the artificial reality devices the sending user may be wearing. Examples of enhancements that can be applied include traditional video and/or audio corrections such as stabilizations, rotations, color and shading corrections, sharpening, focusing, amplifications, volume leveling, equalization, etc. Examples of tags that can be applied include calibration data for devices (applied to the individual feeds of the devices that captured that data), object recognition results, and person recognition results. Additional details on filtering, enhancing, and tagging captured data are discussed below in relation to block 506 of FIG. 5 and FIG. 9.

Compressor 440 can receive the tagged, filtered, and/or enhanced data and can compress it for transmission over a network. In some implementations, this can include applying a compression algorithm specific to the type of the data, such as applying the point cloud library (PCL) to point cloud data or applying MPEG to video data. The compressed data can be transmitted via a network interface of I/O 416, e.g., to another of systems 402-406. Additional details on compressing data are discussed below in relation to block 508 of FIG. 5 and FIG. 10.

Decompressor 442 can decompress data, received via a network interface of I/O 416, that was compressed and sent by another of systems 402-406. In some implementations, this can include applying a decompression algorithm that is a reverse of an algorithm used to compress the data. Additional details on decompressing data are discussed below in relation to block 510 of FIG. 5 and FIG. 11.

Reconstruction module 444 can use depth data from the data decompressed by decompressor 442 to generate a 3D representation of the sending user. Reconstruction module 444 can accomplish this transformation of the depth data into the 3D representation by using calibration data tagged to the depth data to combine data from multiple sources and/or transform the depth data into position and contour information in 3D space (e.g., as a point cloud, a signed distance function, populated voxels, a mesh, a light field, etc.) In some implementations, reconstruction module 444 can also apply color data, from the decompressed data, onto the 3D representation. Additional details on generating a 3D representation from depth data are discussed below in relation to block 512 of FIG. 5 and FIG. 12.

Renderer 446 can receive the 3D representation from reconstruction module 444 and an indication of one or more viewpoints of the receiving user (or a default viewpoint if the one or more viewpoints of the receiving user are not available) to render one or more 2D images of the sending user from the viewpoint of the receiving user. This can include placing a virtual camera in relation to the 3D representation based on the one or more receiving user viewpoints. In some implementations, this can also include adding color data to the 2D images. Additional details on rendering one or more 2D images from a 3D representation at the point of view of a receiving user are discussed below in relation to block 514 of FIG. 5 and FIG. 13.

Display interface 448 can synchronize the 2D images from renderer 446 with audio data and output these synchronized data streams to display hardware and audio hardware of I/O 416. Additional details on displaying rendered images and audio via output hardware are discussed below in relation to block 516 of FIG. 5 and FIG. 14.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
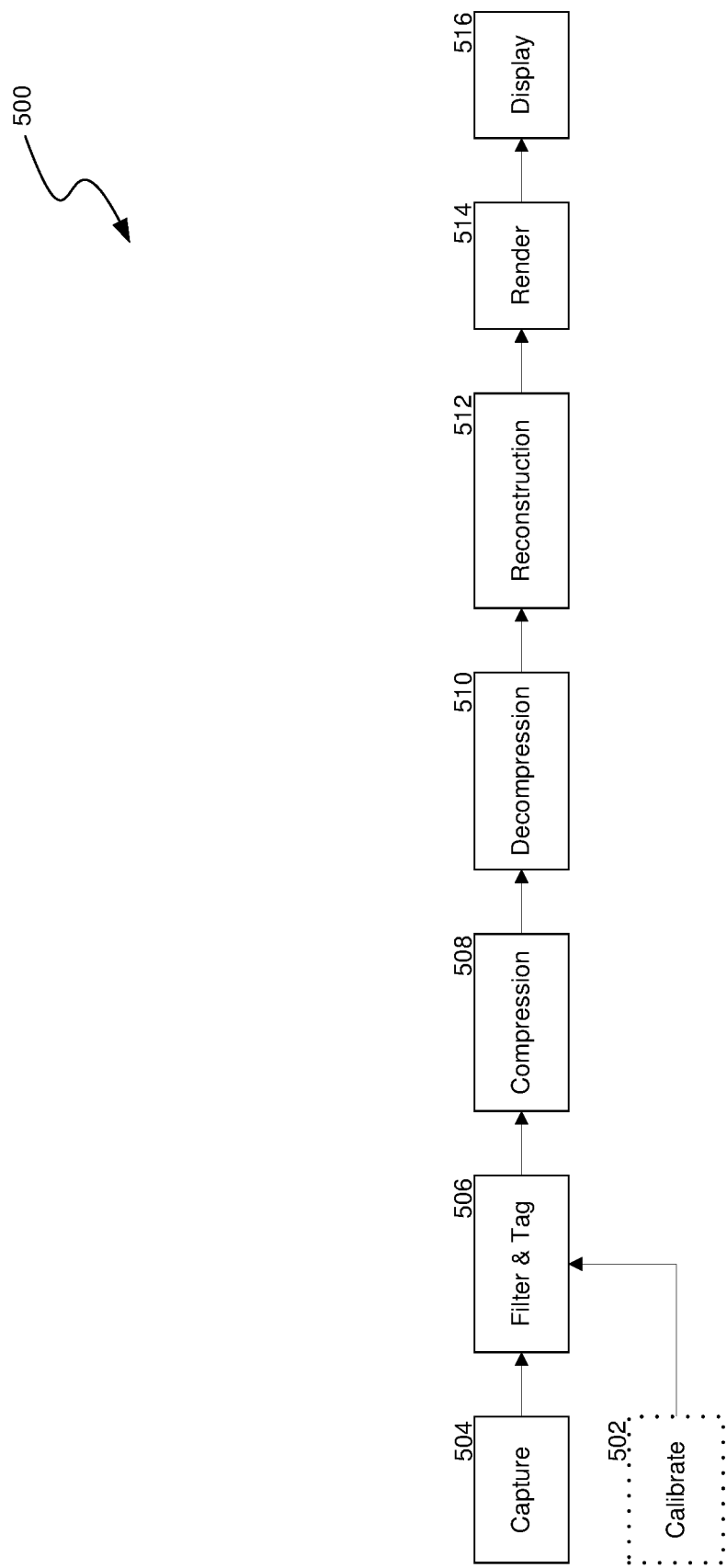
FIG. 5 is a flow diagram illustrating a process used in some implementations of the present technology for a 3D conversation between two or more devices.

FIG. 5 is a flow diagram illustrating a process 500 used in some implementations of the present technology for a 3D conversation between two or more devices. In various implementations, parts of process 500 can be performed on different ones of a sending system, a receiving system, or an intermediate server system. Examples of these divisions of process 500 are described below in relation to FIG. 6.

Calibrate block 502 can determine intrinsic and extrinsic parameters (together "calibration data" or "calibration parameters") for the cameras used by capture block 504. As indicated by the dotted lines, in various implementations, the calibrate block 502 can be performed prior to the conversation starting and/or during the conversation. Intrinsic parameters can specify features of a camera that are internal (and often are generally fixed) for a particular camera. Intrinsic parameters can characterize the optical, geometric, and digital characteristics of the camera, allowing a mapping between camera coordinates and pixel coordinates of an image. Extrinsic parameters can specify conditions or context external to the camera. Extrinsic parameters can be used to characterize light received at each camera pixel, allowing that light to be interpreted in terms of a 3D environment.

In various implementations, parts of the calibration stage can be performed by different entities and/or at different times. For example, an initial calibration to determine intrinsic parameters can be performed at a camera manufacturer, an initial user setup calibration can be performed to determine intrinsic and/or extrinsic parameters, or an online calibration can be performed during the conversation to update intrinsic and/or extrinsic parameters. Also in various implementations, parts of the calibration process can be automatic (e.g., triggered by an identified condition and performed using automatically gathered data) or can be at least partially manual (e.g., employing user input or assistance such as displaying a target image to a camera). Calibration block 502 can receive various calibration data such as measurements of camera components, captured images of known objects (e.g., pre-defined calibration checkerboard or other targets, objects of known dimensions, etc.), environment data (e.g., heat or moisture levels), mapping data (e.g., simultaneous localization and mapping ("SLAM" data), measurements from sensors (e.g., time-of-flight measurements, lighting conditions), etc. and can produce values for the individual calibration parameters. Calibration can include applying transformations to the received data (e.g., camera component measurements, capturing known target images, position sensor data, information from other cameras at known distances, SLAM data, etc.) to identify individual calibration parameters. In various implementations, calibration block 502 can be performed for each camera useable by capture block 504 and the resulting calibration parameters can be stored with associations to the corresponding camera. Additional details on determining calibration parameters are described below in relation to FIG. 7.

Capture block 504 can capture audio, traditional images, and/or depth images/data using one or more capture devices of a sender 3D conversation system. Capture block 504 can receive an instruction to start collecting captured data and, where more than one camera configuration is available, an indication of which cameras to use. Capture block 504 can produce the captured data (e.g., traditional images, depth images, pixel clouds, etc.) with some tagged meta-data. The process performed at capture block 504 can include interfacing with capture hardware to gather capture data and associate the capture data with meta-data such as the time each portion of the capture data was captured and which device captured that portion of the capture data. In various implementations, the capture data can come from one or more of: a black-and-white camera, a color camera, a depth camera, a distance sensor, a microphone, etc. Cameras can be configured to capture images at different resolutions and frame rates either statically or dynamically e.g., based on a conversation context. For example, the system can enable or disable cameras, change capture resolution, frame rate, audio quality, etc. based on one or more of: available bandwidth being above or below corresponding thresholds, according to an ability of the receiving device to display certain types of images (e.g., display 3D images, images at different resolutions, display at various frame rates, etc.), according to user settings, according to a viewpoint of the receiving user, based on which cameras that can see at least part of the sending user, etc. Additional details on gathering captured data at the sending system are described below in relation to FIG. 8.

Filter and tag block 506 can perform various processes to tag the captured data from capture block 504 with further meta-data, improve the quality of the captured data, and/or remove unnecessary portions of the captured data. The processes of the filter and tag block 506 can receive the captured data from capture block 504 (tagged with the devices that captured each portion of the captured data) and the calibration parameters from calibration block 502 (with each set of calibration parameters associated with the device for which that set of parameters was created) and can produce curated data, which has been filtered, enhanced, and tagged with calibration and/or other identifiers. In various implementations, the filtering can include selecting the captured data from the devices that will be used to construct images at the receiving system (e.g., images useable to construct a 3D representation from the receiver's point of view) and/or removing portions of images unnecessary for constructing the 3D representation (e.g., background or other portions of the images not depicting the sending user). In some cases, enhancing the captured data can include cross-referencing captured data from multiple capture devices to enhance image quality. For example, captured data streams from a traditional camera and a depth camera can be used to enhance one another. In some cases, where the captured data includes images from one traditional camera and data from one depth sensor, the depth sensor data can be used to assign each point in image a depth. Where the captured data includes images from multiple traditional cameras, the images can be combined into a weighted combination, where the weights are assigned based on camera on the viewpoint with cameras having a better view of the point given greater weight. This can improve color and/or shading estimates for points in 3D space. Further, depending on the location of the traditional cameras, the system can perform stereo texturing to provide a 3D effect. In addition, where data from multiple depth sensors is included in the captured data, the system can combine this data to provide depth samples covering more of a 3D space. This can provide better volumetric reconstruction of object in the 3D space, solve occlusion issues, and smooth depth spatially and temporally. In some cases, the cross-referenced data streams can be from devices that are within a threshold distance of each other and/or the data streams can first be transformed according to the calibration parameters to compensate for distances between the capture devices. In yet further cases, the enhancing can include creating a depth image based on a traditional image, e.g., using a machine learning model trained to estimate depths based from traditional images. Filter and tag block 506 can tag the captured data with the calibration parameters by matching the calibration parameters associated with the device to the captured data stream taken from that same device. Filter and tag block 506 can tag the data streams with additional information such as identified objects, identified people, and corresponding locations within images for identified tags. Additional details on filtering and tagging are described below in relation to FIG. 9.

Compression block 508 can transform the curated data from block 506 into a format for transmission across a network. In some implementations, this compression can be achieved by applying a video codec, such as an MPEG standard, performing entropy encoding, or applying another known lossy or lossless compression algorithm. In, some implementations, the compression algorithm used can depend on the format of the received data. For example, a point cloud data stream can be compressed using the point cloud library (PCL), the MPEG point cloud compression standard, or another point cloud compression algorithm. Similarly, other data formats can be compressed with known corresponding libraries for those data formats or generic compression algorithms can be applied. In various implementations, the compression can combine the curated data from multiple devices into a single package or can compress each data stream separately. In some cases, the compressed data can include the meta-data applied at block 506 while in other cases these tags can be provided as separate but associated compressed or uncompressed data. In some implementations, captured traditional image data and depth data for corresponding time intervals can be used to compress each other. For example, motion vectors can be determined from one stream and used to help compress the other. In some cases, the compression algorithm used, or parameters set for the compression, can be determined dynamically based on a conversation context (e.g., available bandwidth, display capabilities of receiver, compute capabilities of sender or receiver, etc.) Additional details on compression are described below in relation to FIG. 10.

Decompression block 510 can transform the compressed data back to a version of the original data. Decompression block 510 can receive the compressed data from compression block 508 (having been transmitted across a network) and can apply a reverse of the compression algorithm used to produce compressed data. Similar to the compression process, the decompression algorithm used can depend on the type of compressed data and/or the compression algorithm used. In some implementations, factors of the decompression process can be set based on a conversation context, such as processing power or display capabilities of the receiving system. Additional details on decompression are described below in relation to FIG. 11.

Though not shown in FIG. 5, it will be understood that decompression and recompression can be performed multiple times in the 3D conversation pipeline. For example, a sending system can perform an initial compression, a server system can perform a decompression, process the data, and recompress results, and those results can be sent to a receiver where they are decompressed.

Reconstruction block 512 can create a 3D representation of the sending user (or of multiple users in the case of multiple sending systems) from depth data portion(s) of the decompressed data. The 3D representation can be in various formats such as a point cloud, a signed distance function, populated voxels, a mesh, a light field, etc. Reconstruction block 512 can accomplish this transformation of the depth data into the 3D representation by using the calibration data to combine data from multiple sources and/or transform the captured data into position and contour information in 3D space. For example, each pixel in a depth image depicting a user can be transformed into a 3D representation of at least part of the user by applying transformations based on the intrinsic and extrinsic calibration parameters of the camera. The transformations can take each pixel taken at the camera location and determine a corresponding point in 3D space representing a point on the surface of the user. In some implementations, the reconstruction stage can apply shading and/or color data onto the 3D representation, using the calibration data to map portions of the shading or color data to the 3D representation.

In some implementations, the reconstruction process can be customized based on the computational and display characteristics of the receiving system. For example, only the portion of a 3D representation that can be seen from the receiving user's viewpoint may be created. As another example, there can be various possible types of 3D representations which can have different processing and/or display requirements and the type of 3D representation created can be selected by matching the receiving system processing and display capabilities to corresponding display and processing requirements of a 3D representation. In some implementations where the reconstruction block is performed on a system other than the receiving system, different 3D representations can have different data sizes and the 3D representation type can also be selected based on available bandwidth. In some cases, part or all of the 3D representation may not be direct translations of captured data, such as where none of the captured images of the sending user depict a portion of the 3D representation or where bandwidth or processing limitations did not allow sufficient time to provide portion of the images depicting the sending user. In such cases, some or all of the 3D representation can be approximated with an avatar representation of the sending user, a machine learning estimation of the missing portion (s), or a previously captured version of the missing portion (s) of the sending user. Additional details on reconstruction are described below in relation to FIG. 12.

Render block 514 can generate one or more 2D images of the sending user from a viewpoint of the receiving user. Render block 514 can receive the 3D representation and an indication of the receiving user's viewpoint to produce the 2D images. This can include placing a virtual camera, in relation to the 3D representation, at the receiving user's viewpoint (or at the viewpoint of each eye of the receiving user) which can produce one or more 2D images of the 3D representation from that viewpoint. These images can be generated to meet the display properties of the receiving system, e.g., to match resolution, display size, or display type of the receiving system. For example, where the receiving system is an artificial reality system with a display for each eye, the render stage can generate an image from the viewpoint of each eye at the resolution of these displays. In various implementations, the render stage can generate a single image, two "stereo" images, a light field, etc. In some implementations, the render stage can also apply color or shading data to the rendered images. Applying the color data can include transforming it according to the calibration parameters to be from the viewpoint of the receiving user and applying the color data to the images. In some implementations, a receiving system may be capable of "true 3D" display (e.g., holograms in 3D space, laser plasma displays, crystal cubes, mist screens, etc.), in which case the render stage may be skipped or may simply provide color data to the 3D representation, which can be directly output to the 3D display. Additional details on rendering images from the 3D representation are described below in relation to FIG. 13.

Display block 516 can receive the rendered one or more 2D images and output them via display hardware of the receiving system. This can include, for example, displaying the image(s) on a screen, projecting them onto a "virtual cave" wall, projecting them into a user's eye, etc. Display block 516 can also synchronize visual output with audio output, haptic output, presentation data (e.g., a virtual whiteboard, slide deck, associated images, etc.), or other data received from the sending system as part of the conversation. Additional details on providing output at the receiving device are described below in relation to FIG. 14.

Figure 6:
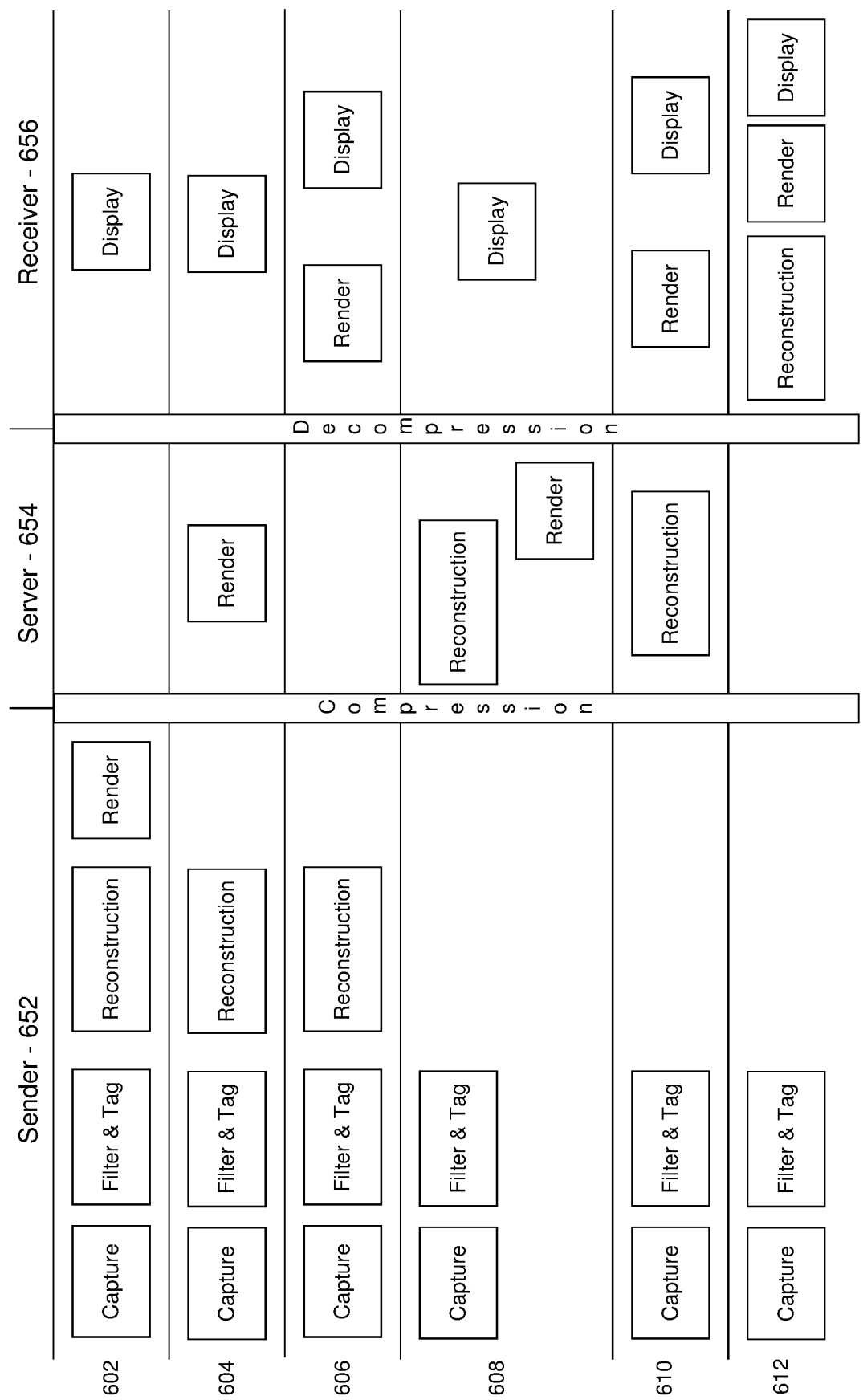
FIG. 6 illustrates variations on the flow diagram from FIG. 5 used in some implementations of the present technology where stages are performed at various systems.

FIG. 6 illustrates variations on the flow diagram from FIG. 5, used in some implementations of the present technology where the variations show stages of the 3D conversation pipeline being performed at different systems. While the pipeline variations 602-612 only show one-way communication—from a sender 652 to a receiver 656—it will be understood that, during some 3D conversations, a system can play the role of both sender 652 and receiver 656.

In each of the variations 602-612, a compression stage can be performed prior to the sender 652 transmitting data and a decompression stage can be performed when the receiver 656 receives compressed data. In variations 604, 608, and 610, where one or more stages are performed by a server system 654, similar decompression and compression stages can be performed by the server system 654.

Variations 602-612 illustrate stages of pipeline configurations performed during a 3D conversation. As discussed above, an additional calibration stage 502 (FIG. 5) can be included in this pipeline, which may be performed prior to and/or during a 3D conversation and can be performed automatically or with user input at various entities, such as by a device manufacturer or by the sending user.

In various implementations, a selected variation (of variations 602-612) used for a 3D conversation can be static or dynamic. In a static configuration, a pre-determination has been made as to where pipeline stages are to be performed. In such static cases, the programming for each stage may only be at the devices where those stages are to be performed.

In various implementations, the same pipeline variation can be used for both directions of information flow between participants of a 3D conversation. In other implementations, however, different pipeline variations can be by the same endpoint devices when acting as sender versus receiver. For example, if one of the participant devices has low processing power, it may only perform a display stage when receiving information (as in variations 602 and 604) and when sending information it only performs a capture and filter and tag stage (as in variations 608-612). Examples of factors for selecting where stages are performed include available sending system and receiving system processing capabilities, whether the sender or receiving system is equipped with specialized hardware to more efficiently perform particular stages, available bandwidth, and capture or display capabilities of participant systems. These factors can be used for static or dynamic selection of a variation.

For implementations in which the variations are dynamic, variations 602-612 can be mapped to various conditions (e.g., threshold values) for one or more of these factors. This will cause a corresponding variation to be used when the matched conditions occur. For example, variations having above a threshold number of capture cameras may cause reconstruction to be at the sending computing system (sender 652); computing power of the sender 652 or receiver 654 being below a given threshold may cause the reconstruction and/or render stages to be performed on the server 654 or on the other of the receiving or sending systems (receiver 656 or sender 652, respectively); available bandwidth being below a threshold may cause reconstruction and/or render to be performed at the sending system (sender 652); or a type of display on receiver 656 can cause all stages except display to happen at the sending system (sender 652).

In variation 602, the capture, filter and tag, reconstruction, and render stages are all performed by the sender 652 while the display stage is performed by the receiver 656. In variation 604, the capture, filter and tag, and reconstruction stages are performed by the sender 652, the render stage is performed by the server system 654, and the display stage is performed by the receiver 656. In variation 606, the capture, filter and tag, and reconstruction stages are performed by the sender 652 and the render and display stages are performed by the receiver 656. In variation 608, the capture and filter and tag stages are performed by the sender 652, the reconstruction and render stages are performed by server system 654, and the display stage is performed by the receiver 656. In variation 610, the capture and filter and tag stages are performed by the sender 652, the reconstruction stage is performed by the server system 654, and the render and display stages are performed by the receiver 656. In variation 612, the capture and filter and tag stages are performed by the sender 652 and the reconstruction, render, and display stages are performed by the receiver 656.

While variations 602-612 each show only a single sender/receiver for a particular pipeline, 3D conversations can involve more than two participants. In some cases where there are more than two participants and where the reconstruction and/or render stages are performed on a system other than the receiving system, the reconstruction and/or render stages can be performed multiple times, once for each receiving system. In some case where there are multiple sending systems, the reconstruction stage can be performed to create a 3D representation including each of the senders and the render stage for each receiver can create 2D images from this combined 3D representation. In other cases, the reconstruction stage can be performed multiple times, once for each sender, and corresponding render stages can be performed in relation to the resulting separate 3D representations of each sender.

Figure 7:
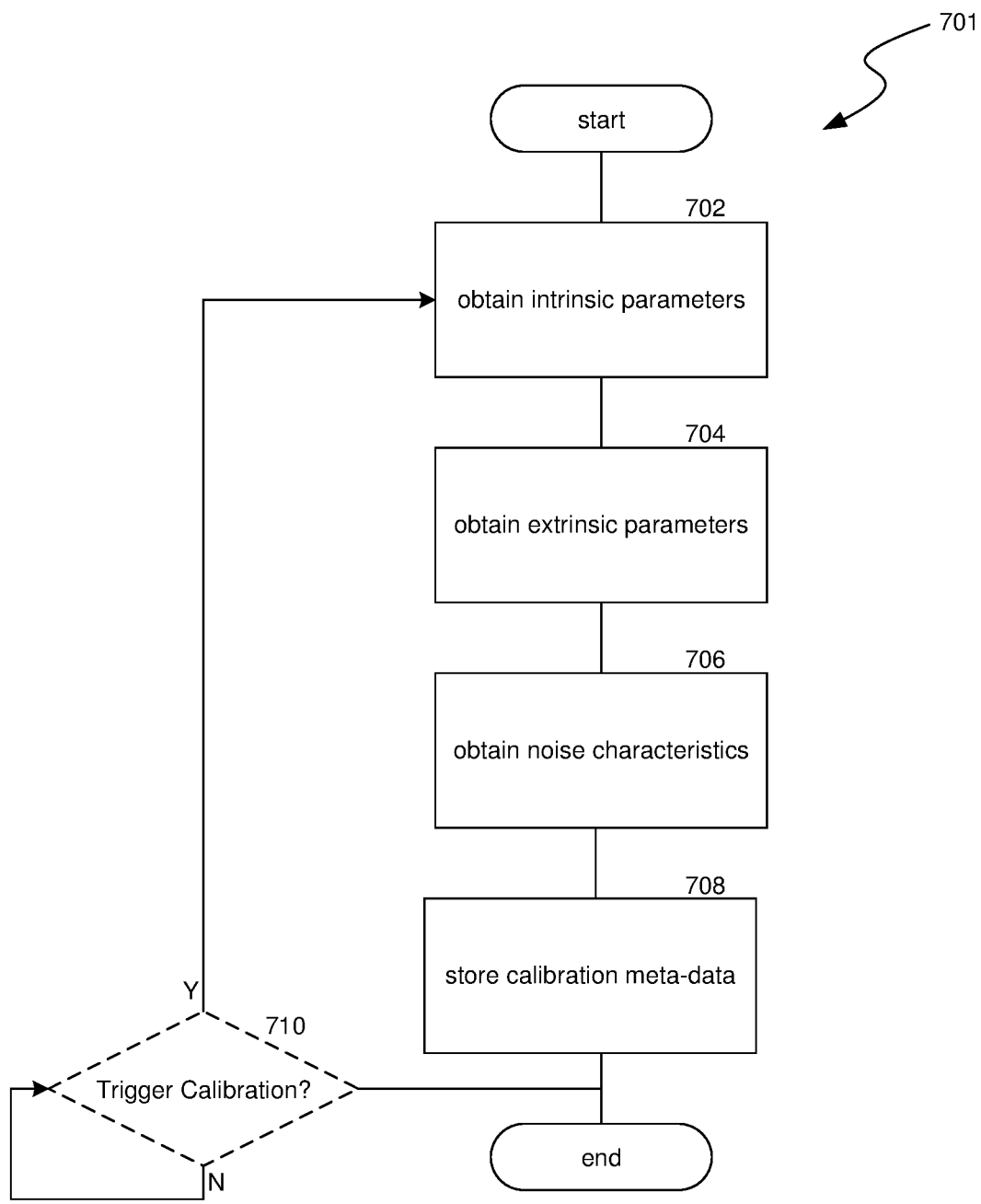
FIG. 7 is a flow diagram illustrating a process used in some implementations of the present technology for a calibration stage of a 3D conversation pipeline.

FIG. 7 is a flow diagram illustrating a process 701 (e.g., the process performed by block 502 of FIG. 5) used in some implementations of the present technology for a calibration stage of a 3D conversation pipeline. At block 702, process 701 can obtain intrinsic parameters for one or more cameras of a sending system. Intrinsic parameters can specify features of a camera that are internal (and often generally fixed) for a particular camera. Examples of intrinsic parameters include focal length, a relationship between a pixel coordinates, lens geometric distortion, etc. These parameters can characterize the optical, geometric, and digital characteristics of the camera, allowing a mapping between camera coordinates and pixel coordinates of an image. In various implementations, block 702 can be performed for each camera that a sending system may use for capturing data for the 3D conversation pipeline.

In various implementations, identifying the intrinsic parameters may be done at different times. As one example, intrinsic parameters can be identified by a manufacturer prior to shipping the camera (where the parameters can be stored in memory of the camera or can be determined for the type of camera generally and stored in associated software such as a driver or other data structure). As another example, intrinsic parameters can be identified when a user initiates an initial configuration (e.g., by using various measuring equipment and/or initiating a process that infers intrinsic parameters by analyzing images taken of known targets, such as a checker pattern with particular dimensions). As a third example, intrinsic parameters can be identified in an online process as a camera is being used (e.g., based on known dimensions of objects in frame, such as dimensions determined for objects that were also in frame during an initial calibration process).

At block 704, process 701 can obtain extrinsic parameters for the one or more cameras of a sending system. Extrinsic parameters can specify conditions or context external to the camera. Examples of extrinsic parameters include the location and orientation of the camera, lighting characteristics (e.g., lighting source location, type, orientation), ambient conditions (e.g., heat, moisture, etc.), etc. These parameters can be used to characterize light received at each camera pixel, allowing that light to be interpreted in terms of a 3D environment. In various implementations, block 704 can be performed for each camera that a sending system may use for capturing data for the 3D conversation pipeline. Identifying the extrinsic parameters may be done at different times, e.g., as part of an initial configuration prior to a 3D conversation and/or online as a conversation progresses to determine or update extrinsic parameters. The extrinsic parameters can be determined using one or more of a variety of processes such as by analyzing images taken of known targets with particular dimensions; by mapping the area surrounding the camera and placing the camera in that area (e.g., using time-of-flight sensors, an encoded inferred dot matrix, or other known techniques); by determining the distance between two or more cameras and using these geometries to make comparisons between images to determine distances to objects; by using existing SLAM data; by updating previous location determinations based on IMU data and/or motion vectors from captured images; etc.

At block 706, process 701 can obtain noise characteristics for the one or more cameras of a sending system. The noise characteristics can be a statistical analysis of variations across images captured by a single camera. Examples of the noise characteristics include photon shot noise, photo response non-uniformity (PRNU), thermal noise, and dark current. In some implementations, the noise characteristics can be included as part of the calibration parameters and can be used, e.g., during reconstruction to account for camera accuracy. In some cases, shot noise and/or dark current noise can be applied to characterize depth camera data. Characterizing noise can facilitate noise reduction, producing higher quality images and depth samples, both in spatial and temporal domains.

At block 708, process 701 can store the calibration parameters obtained at blocks 702-706 as calibration data associated with each camera for which those parameters were determined. For example, the various calibration parameters can be stored in a data structure with an identifier of a corresponding camera as a key.

At block 710, process 701 can determine whether a trigger for updating the calibration data has occurred. While, as discussed above, in various implementations any block from any of the flow charts can be removed or rearranged, block 710 is illustrated in broken lines to call out specific implementations in which block 710 may or may not be performed. In some implementations, for example, calibration is not triggered and thus process 701 ends after block 708. In other implementations, one or more triggers can cause an update to the calibration data, such as when there is above a threshold amount of detected movement of a camera (e.g., based on IMU data, SLAM data, motion vectors in captured images, above a threshold change between a series of capture images, etc.), when a set time since a last calibration expires, when a user initiates a calibration update, when there is a threshold change in temperature or humidity, when there is a threshold change in lighting conditions, etc. Process 701 can remain at block 710 until a trigger is identified, at which point process 701 can repeat from block 702. In some implementations, instead of repeating with all of blocks 702-706, only some of these blocks are repeated. For example, only block 704 may be repeated. In some implementations, the blocks that are repeated may depend on the trigger condition, where certain trigger conditions are mapped to corresponding calibration actions. For example, a detected change in position can cause block 704 to be performed whereas a detected change in temperature can cause both blocks 702 and 704 to be performed. In some implementations, a periodic calibration trigger can occur e.g., once for each 3D conversation or once per day, minute, second, etc.

Figure 8:
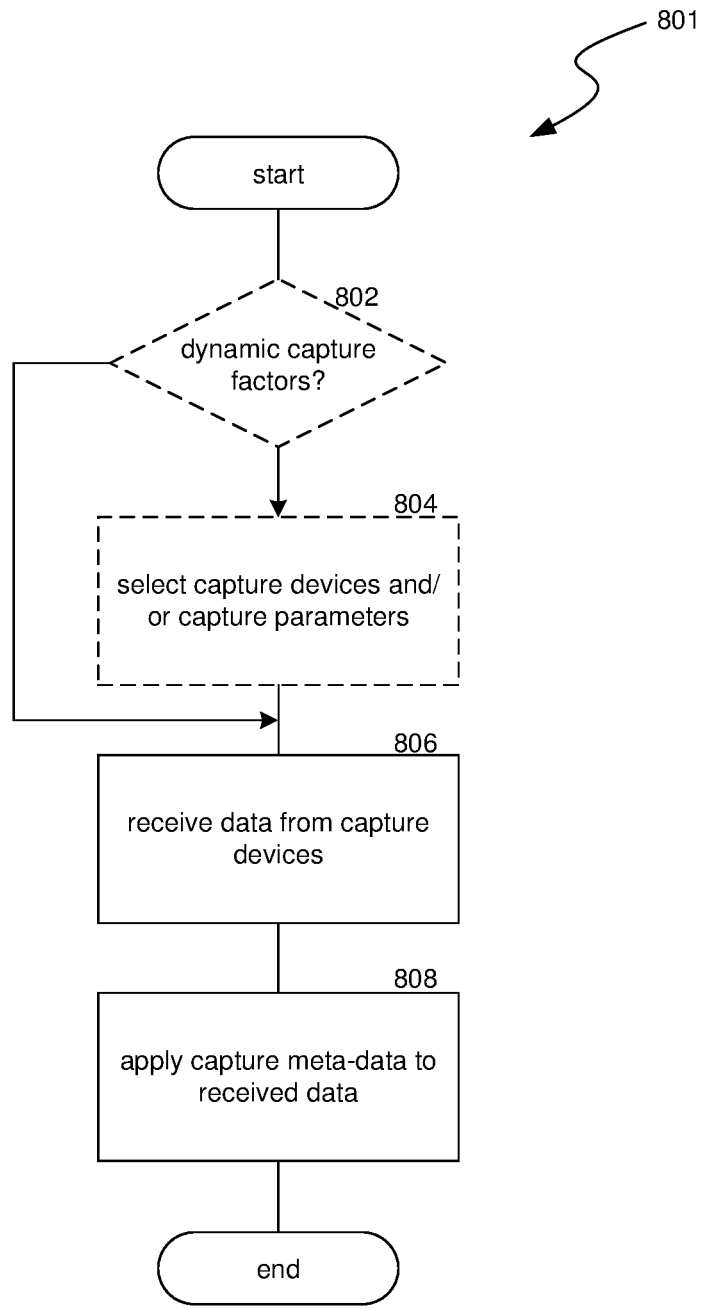
FIG. 8 is a flow diagram illustrating a process used in some implementations of the present technology for a capture stage of a 3D conversation pipeline.

FIG. 8 is a flow diagram illustrating the process 801 (e.g., the process performed by block 504 of FIG. 5) used in some implementations of the present technology for a capture stage of a 3D conversation pipeline. At block 802, process 801 can determine whether any dynamic capture factors are indicated. Dynamic capture factors can be parts of a conversation context that are mapped to a capture configuration (e.g., enabled or disabled capture devices, a set of capture devices to use for the 3D conversation, or settings to use on one or more of the capture devices). In various implementations, the dynamic capture factors can include one or more of available bandwidth being above or below a corresponding threshold, display abilities of a receiving system, a sending or receiving system battery level being above or below a corresponding threshold, user settings, a viewpoint of a receiving user as compared to positions of sending system cameras, or any combination thereof.

At block 804, process 801 can use a mapping of the dynamic capture factors to a capture configuration to select capture devices and/or a set of capture device parameters. In various implementations, the mapping can map the dynamic capture factors to one or more of: cameras or microphones to enable or disable, changes in camera framerate or resolution, changes in audio capture quality, or selection of which captured data feeds to use. For example, a conversation context such as the processing power of the recipient being below a threshold, available bandwidth being below a threshold, a battery level of the sending system being below a threshold, or an inability of the recipient system to display 3D or high resolution images can be mapped to a corresponding reduction in the number of cameras used by the sending system and/or a reduction in the frame rate or resolution for the cameras used by the sending system. In some implementations, such a reduction can cause the 3D conversation pipeline to transition to a different flow at one or more stages, such as by using different data structures, providing lower resolution, or degrading to traditional 2D video calling or audio only calling. As another example, a recipient system can provide the current viewpoint of the receiving user and this can be translated (using the calibration data) to determine which camera(s) are positioned to capture parts of the user that would be visible from that viewpoint and other cameras can be disabled or images from other cameras can be excluded from the captured data. As yet a further example, a user can activate a control to switch to 2D calling, which can be mapped to only capturing images from a single camera focused on the sending user's face (also causing other stages to be modified or skipped, e.g., using MPEG video compression instead of the PCL for compression and skipping the reconstruction stage).

While, as discussed above, in various implementations any block from any of the flow charts can be removed or rearranged, blocks 802 and 804 are illustrated in broken lines to call out specific implementations where blocks 802 and 804 may or may not be performed. In some implementations, there is no dynamic selection of capture devices and thus process 801 begins at block 806.

At block 806, process 801 can receive data from one or more capture devices. This can be a single set of capture devices connected to the sending system (using default settings, e.g., resolution, framerate, etc.), a default set of capture devices (using default settings), or if the processes of blocks 802 and 804 were performed, the capture devices and/or the capture device settings selected at block 804. In various implementations, the capture devices can capture one or more of black-and-white images, color images, depth images, point cloud data, Semi-Global Matching (SGM) data, audio, etc., or any combination thereof.

At block 808, process 801 can associate capture meta-data to the captured data. Examples of capture meta-data include the time that portions of the captured data were captured and an indicator of which device captured that data.

Figure 9:
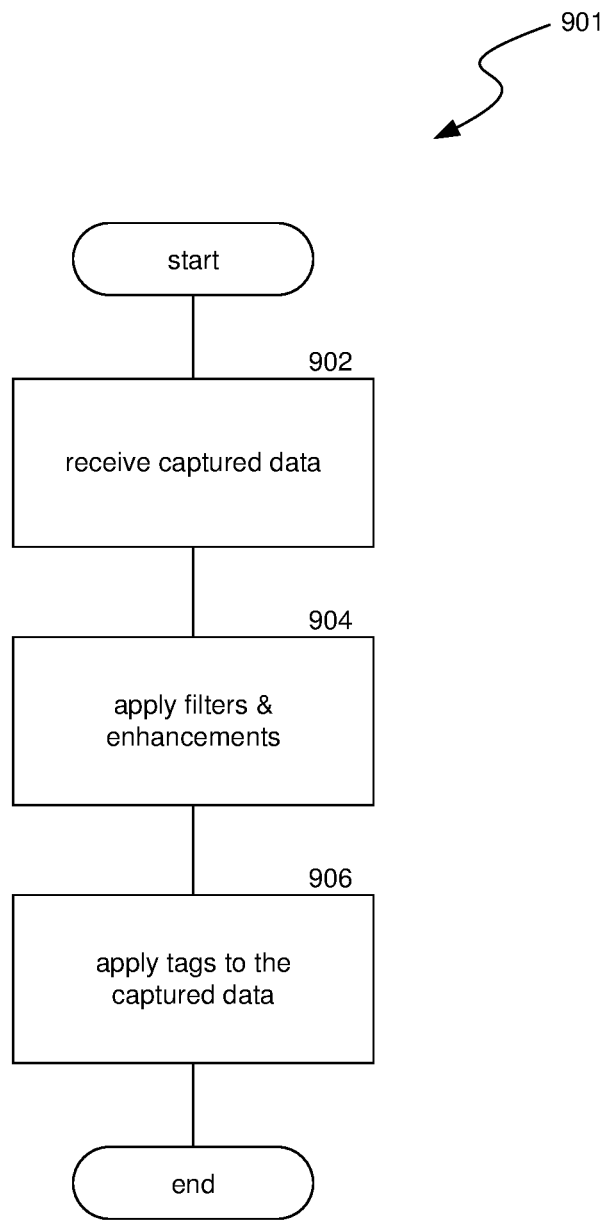
FIG. 9 is a flow diagram illustrating a process used in some implementations of the present technology for a filter and tag stage of a 3D conversation pipeline.

FIG. 9 is a flow diagram illustrating a process 901 (e.g., the process performed by block 506 of FIG. 5) used in some implementations of the present technology for a filter and tag stage of a 3D conversation pipeline. At block 902, process 901 can receive captured data. This can be the data captured by process 801.

At block 904, process 901 can apply filter and/or enhancement algorithms to the captured data. The filter algorithms can remove portions of captured image data that do not depict the sending user (or objects with which the sending user is interacting or other designated areas such as whiteboards or presentation materials to be sent to the receiving system), can remove background audio, can add effects (e.g., augmented reality effects such as changing dimensions or coloring for the sending user, adding virtual objects to the captured images, or adding sound effects), etc. The enhancements can include traditional video and/or audio corrections such as stabilizations, rotations, color and shading corrections, sharpening, focusing, amplifications, volume leveling, equalization, etc. In some implementations, the enhancements can also include cross stream enhancements where data such as motion vectors determined from one capture device can be used to enhance the data from another capture device. For example, where a depth and a color camera are placed side-by-side, the motion vectors determined from the captured color data stream can be used to enhance the depth data stream (or vice-versa). In some implementations, the enhancements can include converting one or more traditional images into 3D data. In various implementations, this can include applying a machine learning model trained to determine depth data for traditional images. In some implementations, this can also include using the calibration data and/or data from multiple cameras to determine depth data based on the camera intrinsic and extrinsic properties and/or the relationships between images that captured overlapping areas. In yet further embodiments, the enhancements can include additional analysis of the captured data, such as to determine and add an alternate view of the depicted user. For example, process 901 can identify a "skeleton view" of the user based on traditional and/or depth data to include as a further or alternate data stream. A skeleton view divides the users into primary parts (e.g., hands, forearms, upper arms, shoulders, torso, etc.) and depicts these parts of the user as connected lines—giving a body pose of the user without body contours.

At block 906, process 901 can apply tags to the captured data. In some implementations, these tags can be the calibration data generated by process 701, where each data stream is tagged with the calibration data generated for the capture device that captured that data stream. In some implementations, other or additional tagging can be performed such as identifying objects or people within various portions of the captured data and tagging those portions with the identifications (e.g., by frame or by locations within frames), tagging conditions of the captured data (e.g., places where movement above a threshold is identified, changes in people in frame, etc.), identifying voices in audio and tagging time segments with the identified voices, etc.

Figure 10:
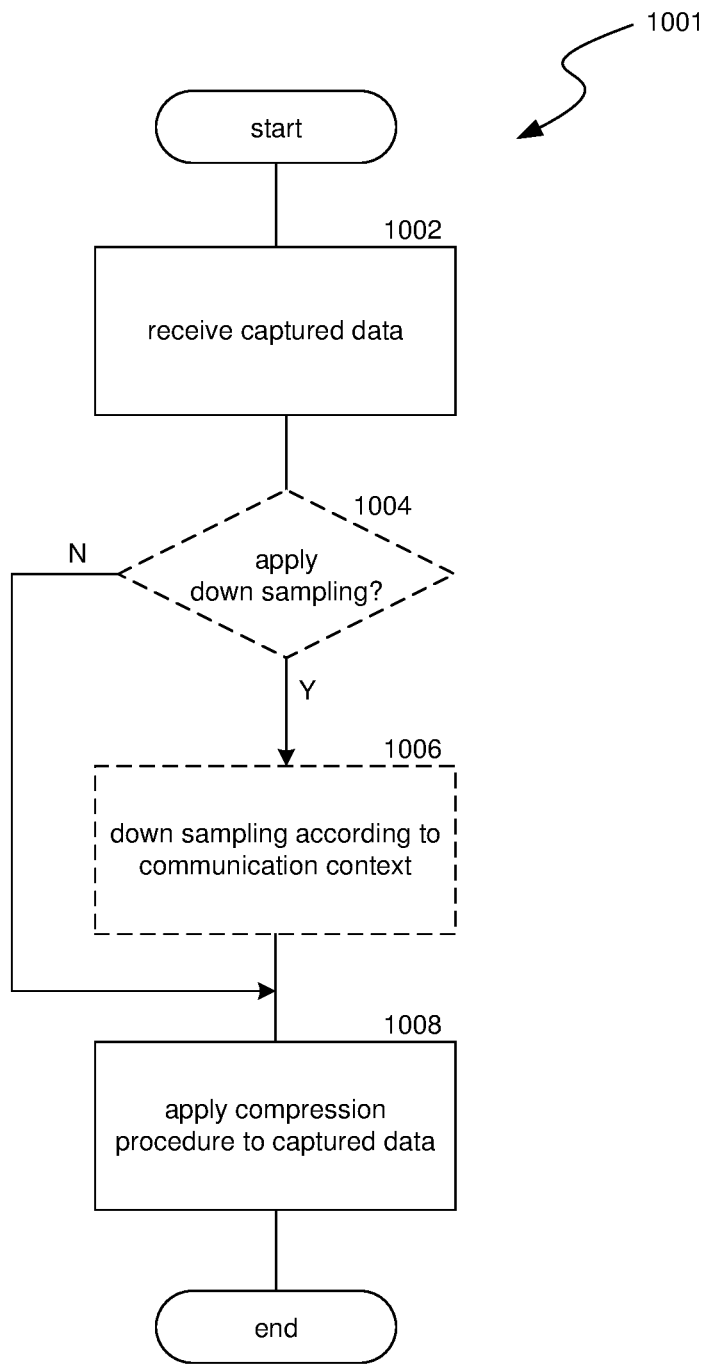
FIG. 10 is a flow diagram illustrating a process used in some implementations of the present technology for a compression stage of a 3D conversation pipeline.

FIG. 10 is a flow diagram illustrating a process 1001 (e.g., the process performed by block 508 of FIG. 5) used in some implementations of the present technology for a compression stage of a 3D conversation pipeline. At block 1002, process 1001 can receive the captured data, as filtered, enhanced, and/or tagged by process 901.

At block 1004, process 1001 can determine whether conversation context factors indicate whether to apply down sampling to the captured data. For example, the captured data can be down sampled to match the display capabilities of the receiving system or to reduce data complexity, thereby reducing the bandwidth needed to transmit the compressed data and reducing the compute power for the receiving device to decompress and reconstruct the data. In various examples, thresholds of available bandwidth, sender or receiver processing capabilities, or receiver display capabilities, can each be mapped to particular bitrates, frame rates, etc. At block 1004, current conversation context factors can be identified and the mapping can be used to select maximum data characteristics. If the data received at block 1002 has higher characteristics than the selected maximum data characteristics then, at block 1006, process 1001 can down sample the received data to the maximum data characteristics. In some implementations, the characteristics of the received data will already match capabilities of the receiving system because the capture devices were dynamically set to capture data with characteristics matching the receiving system.

While, as discussed above, in various implementations, any block from any of the flow charts can be removed or rearranged, blocks 1004 and 1006 are illustrated in broken lines to call out specific implementations where blocks 1004 and 1006 may or may not be performed. In some implementations, there is no dynamic down sampling and thus process 1001 can go from block 1002 to block 1008.

At block 1008, process 1001 can apply one or more compression procedures to the received data (as down sampled at block 1006, if any). In some implementations, the down sampling of block 1006 can be performed as part of the compression performed at block 1008. In various implementations, the compression procedures can be lossy or lossless. The compression procedures can be selected to match a type of the received data. For example, if part of the received data is a point cloud, then a compression procedure for point clouds (e.g., the MPEG codec for point clouds or the PCL) can be selected to compress this part of the received data. In various implementations, the received data from each capture device can be compressed separately and/or the body of all the captured data can be compressed into a single package. In some implementations, data from one part of the received data can be used to more effectively compress another part. For example, motion vectors from a data stream of a depth camera can be used to compress a color video data stream taken from a camera that is within a threshold position of the depth camera. The compressed data can then be transmitted to a receiving system or an intermediary server.

Figure 11:
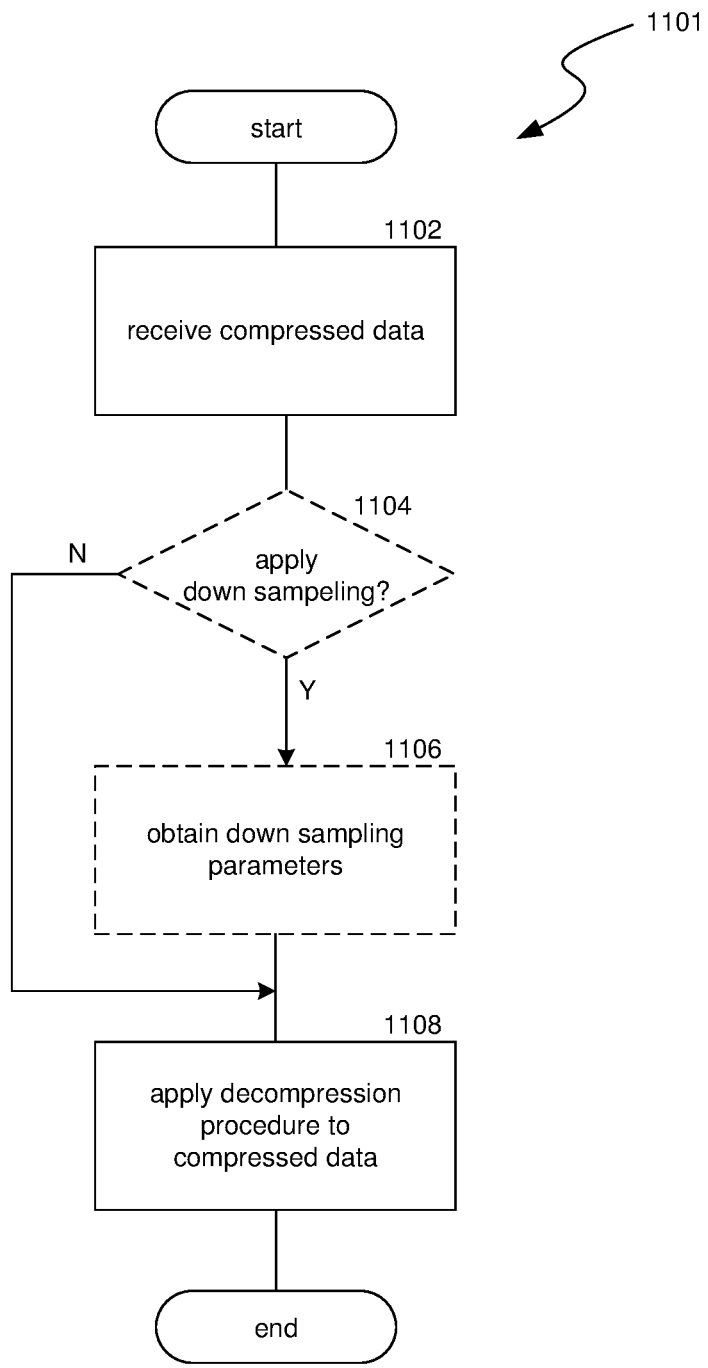
FIG. 11 is a flow diagram illustrating a process used in some implementations of the present technology for a decompression stage of a 3D conversation pipeline.

FIG. 11 is a flow diagram illustrating a process 1101 (e.g., the process performed by block 510 of FIG. 5) used in some implementations of the present technology for a decompression stage of a 3D conversation pipeline. At block 1102, process 1101 can receive data compressed by process 1001, having been transmitted over a network.

At block 1104, process 1101 can determine whether conversation context factors indicate whether to apply down sampling to the received data. For example, the received data can be down sampled to match the display capabilities or available compute power of the receiving device. In various examples, thresholds of receiver processing capabilities or display capabilities can each be mapped to particular bitrates, frame rates, etc. At block 1104, current conversation context factors can be identified, and the mapping can be used to select these maximum data characteristics. If the data received at block 1102 has higher characteristics than the selected maximum data characteristics then, at block 1106, process 1101 can down sample the received data to match the maximum data characteristics. In some implementations, the characteristics of the received data will already match capabilities of the receiving system because the capture devices were dynamically set to capture data with characteristics matching the receiving system or compression process 1001 already down sampled the data to match the receiving system.

While, as discussed above, in various implementations, any block from any of the flow charts can be removed or rearranged, blocks 1104 and 1106 are illustrated in broken lines to call out specific implementations where blocks 1104 and 1106 may or may not be performed. In some implementations, there is no dynamic down sampling and thus process 1101 can go from block 1102 to block 1108.

At block 1108, process 1101 can apply one or more decompression procedures to the received data (as down sampled at block 1106, if any). In some implementations, the down sampling of block 1106 can be performed as part of the decompression performed at block 1108. In various implementations, the decompression procedures can be lossy or lossless. The decompression procedures can be selected to match a type of compression used to compress the received data.

Figure 12:
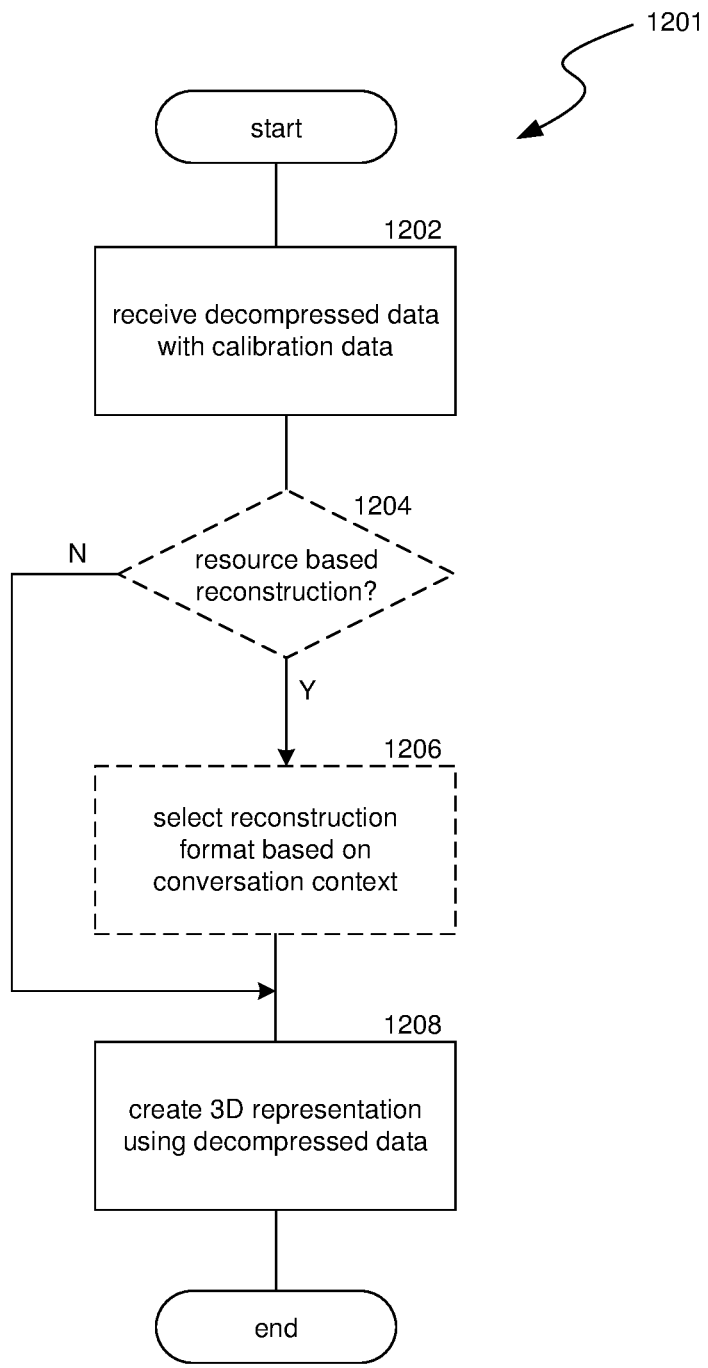
FIG. 12 is a flow diagram illustrating a process used in some implementations of the present technology for a reconstruction stage of a 3D conversation pipeline.

FIG. 12 is a flow diagram illustrating a process 1201 (e.g., the process performed by block 512 of FIG. 5) used in some implementations of the present technology for a reconstruction stage of a 3D conversation pipeline. At block 1202, process 1201 can receive data decompressed by process 1101. At block 1204, process 1201 can determine whether conversation context factors indicate whether to adjust the process for generating a 3D reconstruction based on available resources. In some implementations, types of reconstructed representations (e.g., point clouds, truncated sign distance function (TSDF), populated voxels, mesh, light fields, etc.) can be associated with data processing levels or requirements and/or display characteristics. For example, a TSDF representation can be assigned a processing level greater than a level for point clouds. At block 1206, current data processing and/or display capabilities of the receiving system can be matched to the processing levels or requirements and/or display characteristics of the representations to select a representation type to use. In some implementations where process 1201 reconstruction is performed on a system other than the receiving system (e.g., in versions 602-610 of FIG. 6) representations can also be characterized according to an average size of that type of reconstruction and the type of reconstruction selected can further be selected based on available bandwidth.

While, as discussed above, in various implementations, any block from any of the flow charts can be removed or rearranged, blocks 1204 and 1206 are illustrated in broken lines to call out specific implementations where blocks 1204 and 1206 may or may not be performed. In some implementations, there is no dynamic reconstruction type selection and thus process 1201 can go from block 1202 to block 1208.

At block 1208, process 1201 can create a 3D representation from the decompressed data, in either a default representation format or a format selected at block 1206. Reconstruction block 1201 can accomplish this transformation of the depth data into the 3D representation using the calibration data to combine data from multiple sources and/or transform the captured data into position and contour information in 3D space. For example, each pixel in a depth image depicting a user can be transformed into a 3D representation of at least part of the user by applying transformations based on the intrinsic and extrinsic calibration parameters of the camera. The transformations can take each pixel taken at the camera location and determine a corresponding point in 3D space representing a point on the surface of the user. In some implementations, the reconstruction stage can apply shading or color data to the 3D representation, using the calibration data to map portions of the shading or color data to the 3D representation. In various implementations, creating a 3D representation can be performed using, e.g., an Integrated 6DoF Video Camera and System Design (see e.g., the system described at https://research.fb.com/publications/an-integrated-6dof-video-camera-and-system-design/and https://research.fb.com/wp-content/uploads/2019/09/An-Integrated-6DoF-Video-Camera-and-System-Design.pdf); and Immersive Light Field Video with a Layered Mesh Representation sysetm (see e.g., the system described at https://augmentedperception.github.io/deepviewvideo/ and https://storage-.googleapis.com/immersive-If-video-siggraph2020/ImmersiveLightFieldVideoWithALayeredMesh Representation.pdf); a Dynamic Fusion system (see e.g., the system described at https://grail.cs.washington.edu/projects/dynamicfusion/ and https://grail.cs.washington.edu/projects/dynamicfusion/papers/DynamicFusion.pdf); or a Fusion4D: system (see e.g., the system described at https://www.microsoft.com/en-us/research/wp-content/uploads/2016/11/a114-dou.pdf); each of these is incorporated herein by reference.

In some cases, part or all of the 3D representation may not be direct translations of captured data, such as where none of the captured images of the sending user depict a portion of the 3D representation or where bandwidth or processing limitations did not allow sufficient time to provide a portion of the images depicting the sending user. In some such cases, some or all of the 3D representation can be approximated with an avatar representation of the sending user, a machine learning estimation of the missing portion(s), or previously captured versions of the missing portion(s) of the sending user. In other such cases, the reconstruction stage can be skipped, reverting instead to traditional 2D video calling or voice calling.

Figure 13:
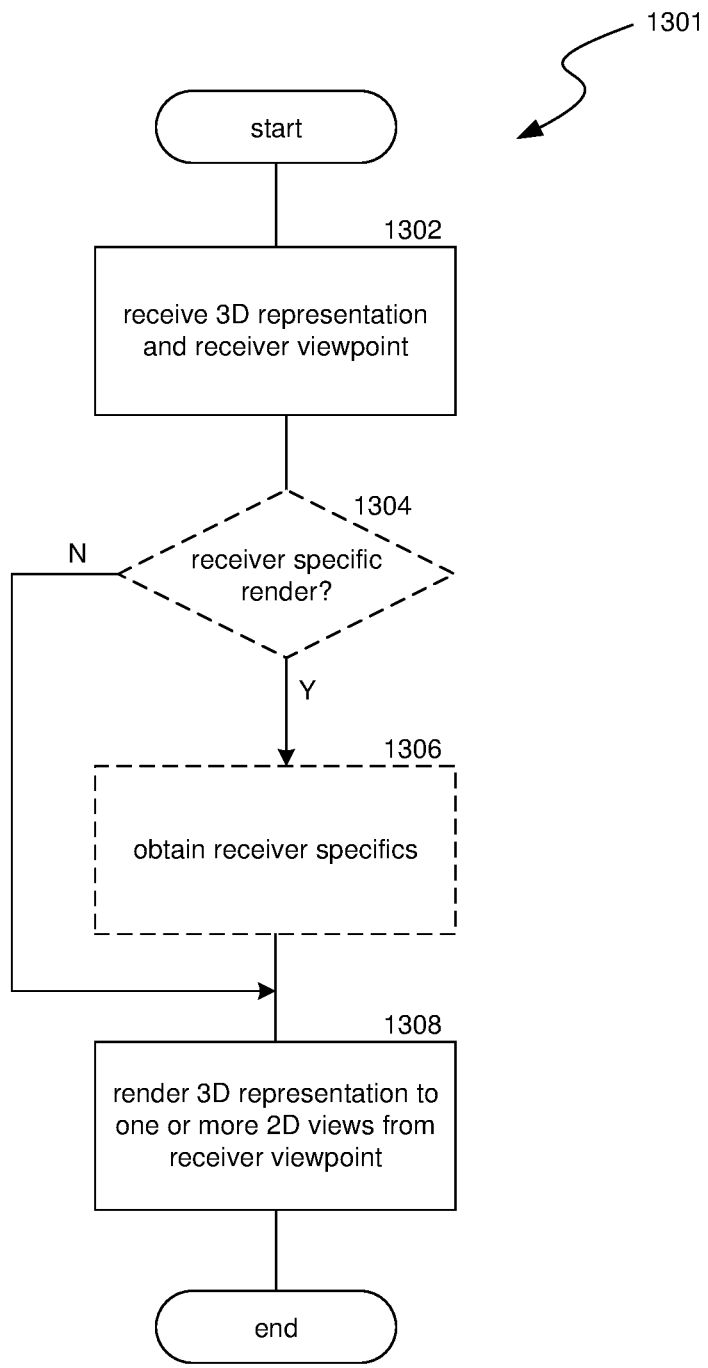
FIG. 13 is a flow diagram illustrating a process used in some implementations of the present technology for a render stage of a 3D conversation pipeline.

FIG. 13 is a flow diagram illustrating a process 1301 (e.g., the process performed by block 514 of FIG. 5) used in some implementations of the present technology for a render stage of a 3D conversation pipeline. At block 1302, process 1301 can receive a 3D representation from process 1201 and an indication of a current viewpoint of the receiving user. At block 1304, process 1301 can determine whether process 1301 is being performed to dynamically select rendering settings specific to the receiving system. For example, where the render stage is performed on a system other than the receiving system (e.g., versions 602, 604, and 608 of FIG. 6), the render stage can receive display capabilities (e.g., resolution, frame rate, single display or stereo display, etc.) of each receiving system at block 1306 and can use those specifics to, at block 1308, render one or more images to those capabilities. For example, images can be rendered to the same resolution as a receiving system or an image can be rendered for each eye viewpoint of the receiving user. While, as discussed above, in various implementations, any block from any of the flow charts can be removed or rearranged, blocks 1304 and 1306 are illustrated in broken lines to call out specific implementations where blocks 1304 and 1306 may or may not be performed. In some implementations, there is no dynamic, receiver-specific rendering and thus process 1301 can go from block 1302 to block 1308.

At block 1308, process 1301 can render one or more images for display by a receiving system using default render parameters (either generic parameters or previously configured for the particular receiving system) or parameters selected for the receiver specifics obtained at block 1306. Generating these images can include placing a virtual camera, in relation to the 3D representation, at the receiving user's viewpoint (or two virtual cameras at the viewpoint of each eye of the receiving user) to produce one or two 2D images from the 3D representation from the viewpoint of the virtual camera(s). Where the reconstruction stage did not include adding color data to the 3D representation, the render stage can further include adding color data, captured by traditional cameras and transformed according to the calibration data, to the rendered images. In some implementations, this can include using color data from the camera closest to the viewpoint of the receiving user. In some implementations, rendering can include performing additional modifications, such as removing an artificial reality device from the display of the sending user (see e.g., FIG. 15), adding additional feeds (e.g., a presentation or slide deck to the images), adding stickers, effects or filters, etc.

Figure 14:
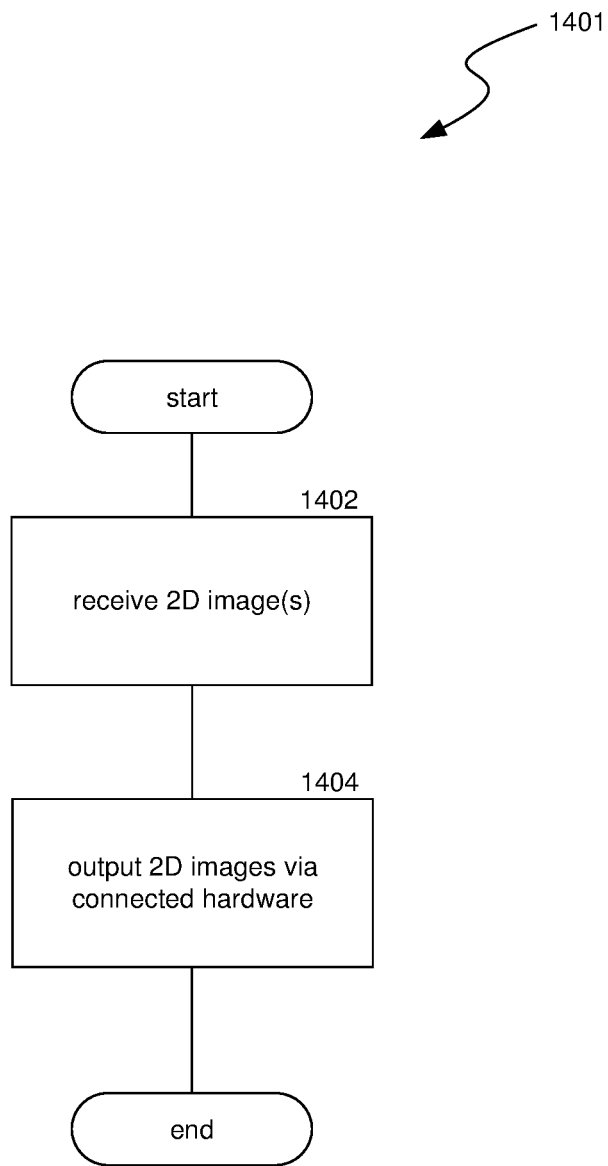
FIG. 14 is a flow diagram illustrating a process used in some implementations of the present technology for a display stage of a 3D conversation pipeline.

FIG. 14 is a flow diagram illustrating a process 1401 (e.g., the process performed by block 516 of FIG. 5) used in some implementations of the present technology for a display stage of a 3D conversation pipeline. At block 1402, process 1401 can receive the 2D images rendered by process 1401 (or 3D representations if the receiving system has a true 3D display). At block 1404, process 1401 can interface with a display system (e.g., a screen, various types of projectors such as LED, microLED, LASER, etc.) to display the images. Outputting the images can be synchronized with outputting audio according to time tags added during the capture stage.

Figure 15A:
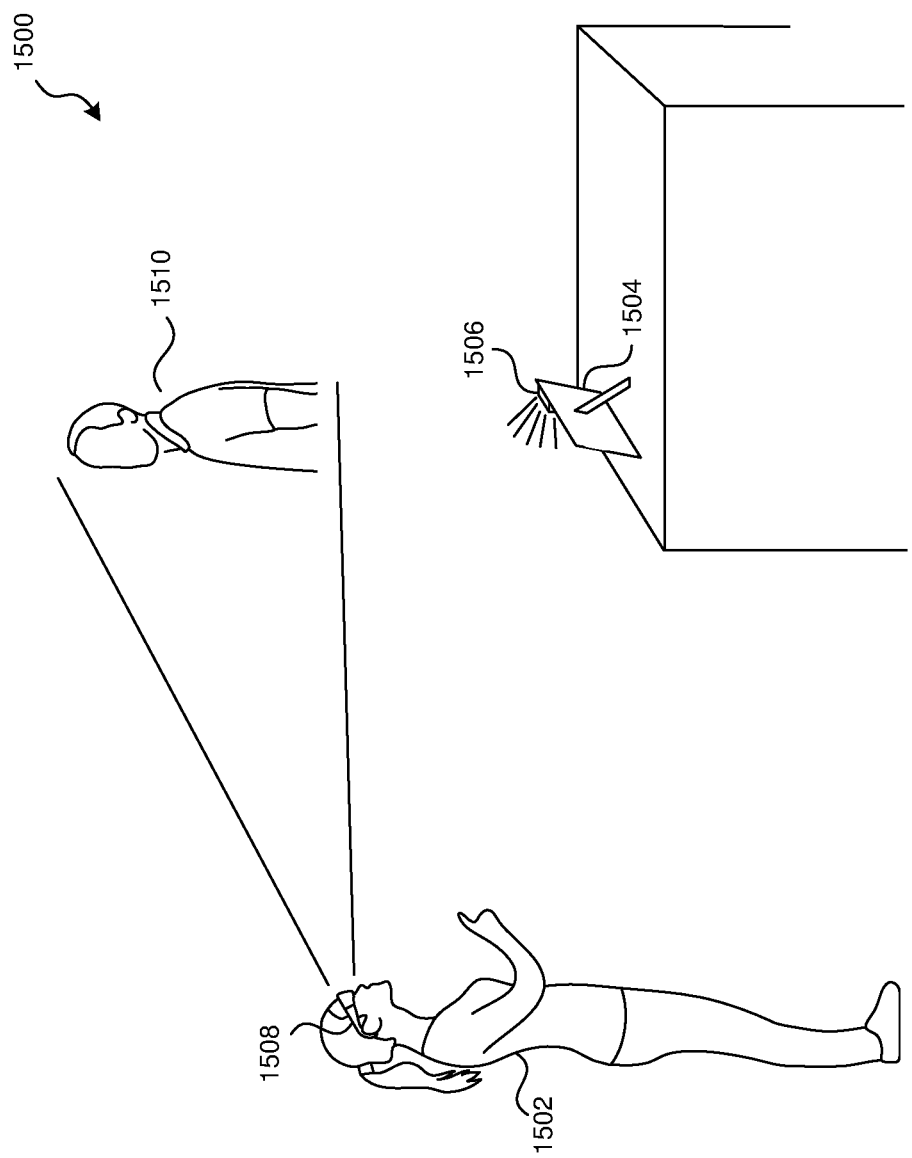
FIG. 15A is a conceptual diagram illustrating an example 3D conversation from a first system perspective in an artificial reality environment.

FIGS. 15A and 15B are conceptual diagrams illustrating examples 1500 and 1550 of a 3D conversation in an artificial reality environment. Example 1500 illustrates a first side of a 3D conversation where a sending/receiving device 1504 includes capture devices 1506 (color camera, depth camera, and microphone). The cameras of capture devices 1506 are each associated with calibration data defining the camera's intrinsic parameters (the optical, geometric, and digital characteristics of the camera) determined during manufacture of the camera and extrinsic parameters (location and orientation in the 3D environment). The capture devices 1506 capture color images, depth images, and an audio feed of user 1502, which are tagged with capture time and which device captured each part of the captured data. Device 1504 then performs filtering and tagging to remove portions from images not depicting the user, remove background noise from the audio stream, and, based on the device tags and the associations between the calibration data and device identifiers, tags the calibration data for the device that captured each part of the data to the corresponding captured data. Device 1504 then compresses each of the filtered and tagged data streams and sends them to device 1554 (FIG. 15B).

Meanwhile, device 1504 is also receiving compressed data streams from device 1554 (FIG. 15B). Device 1504 decompresses these data streams into color images, depth data, and audio data (with associated calibration data). Device 1504 next reconstructs the depth data and calibration data into a 3D representation (in this case a point cloud). Device 1504 takes an indication of the viewpoints of each eye of user 1502, as detected by artificial reality device 1508, to place virtual cameras in relation to the point cloud to generate two 2D images of user 1552 (FIG. 15B) from a viewpoint of the user 1502. Device 1504 also adds color data to these images based on the calibration data and synchronizes them with the audio data based on time tags associated with the data feeds. In examples 1500 and 1550, rendering further includes using machine learning object recognition to remove, from the representations of the users 1502 and 1552, the artificial reality devices 1508 and 1558 and further using predicative machine learning to fill in the missing portions of the representations of the users, allowing the users to appear as if they were not wearing the artificial reality devices. Device 1504 finally provides these images and synchronized audio to artificial reality device 1508 so artificial reality device 1508 can project a representation 1510 of user 1552 (FIG. 15B). In example 1550 (FIG. 15B), user 1552 is holding capture devices 1556 close to his body, allowing only the capture of user 1552's head and upper torso. Thus, the generated 3D representation, subsequent 2D images, and ultimately the projection 1510 only show the upper part of the user 1552.

Example 1550 illustrates a second side of the 3D conversation which performs a similar process to example 1500. In particular, sending/receiving device 1554 includes hand-held capture devices 1556 (color camera, depth camera, and microphone). The cameras of capture devices 1556 are each associated with calibration data defining the camera's intrinsic parameters (the optical, geometric, and digital characteristics of the camera) determined during manufacture of the camera and extrinsic parameters (location and orientation in the 3D environment). The capture devices 1556 capture color images, depth images, and an audio feed of user 1552, which are tagged with capture time and which device captured each part of the captured data. Device 1554 then performs filtering and tagging to remove portions from images not depicting the user 1552, remove background noise from the audio stream, and, based on the device tags and the associations between the calibration data and device identifiers, tags the calibration data for the device that captured each part of the data to the corresponding captured data. Device 1554 then compresses each of the filtered and tagged data streams and sends them to device 1504 (FIG. 15A).

Meanwhile, device 1554 is also receiving the compressed data streams from device 1504 (FIG. 15A). Device 1554 decompresses these data streams into color images, depth data, and audio data (with associated calibration data). Device 1554 next reconstructs the depth data and calibration data into a 3D representation (in this case a 3D mesh). Device 1554 takes an indication of a viewpoint of user 1552, as detected by artificial reality device 1558, to place a virtual camera in relation to the 3D mesh to generate a 2D image of user 1502 (FIG. 15A) from a viewpoint of the user 1552. Device 1554 also adds color data to this image based on the calibration data and synchronizes the image with the audio data based on time tags associated with the data feeds. Device 1554 removes, from the representation of the users 1502, the artificial reality devices 1508, allowing the user 1502 to appear as if she were not wearing the artificial reality device 1508. Device 1552 finally provides these images and synchronized audio to artificial reality device 1558 so artificial reality device 1558 can project a representation 1560 of user 1502. In example 1500 (FIG. 15A), user 1502 has placed capture devices 1506 on a surface far enough from her body to capture images of her entire body. Thus the generated 3D representation, subsequent 2D images, and ultimately the projection 1560 shows a complete representation of the user 1502. Further, in example 1550, user 1552 has moved around the projection of user 1560 during the 3D conversation. Thus, the viewpoint of user 1552 is toward the side of the projection 1560. Accordingly, during rendering, the virtual camera is placed to the side of the 3D representation, producing images shown projection 1560 being from the side of the user 1502.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computer-readable storage medium storing instructions that, when executed by a computing system, cause the computing system to perform a process for providing a 3D conversation, the process comprising:
obtaining 3D conversation data comprising color information and depth information;
obtaining calibration data comprising one or more of: A) first parameters specifying surrounding conditions and/or context detected for one or more cameras that captured the color information and/or depth information, B) second parameters specifying intrinsic features of the one or more cameras that captured the color information and/or depth information, C) image noise characteristics specifying variations across a sequence of images in the color information and/or depth information, or any combination thereof; and
providing transmission data, based on the 3D conversation data and calibration data, to a reconstruction system that:
transforms, based on the calibration data, a version of the transmission data into a 3D representation by X) combining data, captured by multiple sources, from the version of the transmission data and/or Y) determining position and contour information in 3D space for aspects of the transmission data;
wherein the 3D representation is rendered into one or more 2D images; and
wherein the one or more 2D images are output by a recipient system engaged in the 3D conversation.

2. The computer-readable storage medium of claim 1, wherein the reconstruction system transforms the version of the transmission data into the 3D representation in part by both X) combining data, captured by multiple sources, from the version of the transmission data and Y) determining position and contour information in 3D space for aspects of the transmission data.

3. The computer-readable storage medium of claim 1,
wherein the reconstruction system transforms the version of the transmission data into the 3D representation in part by applying one or more transformations to each pixel, specified in the depth information and that corresponds to a depiction of a user, into a 3D representation of at least part of the user based on the calibration data; and
wherein the one or more transformations generate, for each pixel the one or more transformations are applied to, a point in 3D space, wherein that point in 3D space represents a point on the surface of the user and is determined based on a determined camera location specified in the calibration data.

4. The computer-readable storage medium of claim 1, wherein the reconstruction system applies shading and/or color data onto the 3D representation, using the calibration data to map portions of the color information to the 3D representation.

5. The computer-readable storage medium of claim 1, wherein the 3D conversation data was acquired from multiple depth sensors and wherein the process further comprises combining the data from the multiple depth sensors into the depth information.

6. The computer-readable storage medium of claim 5, wherein the combining the data from the multiple depth sensors comprises compensating for distances between the multiple depth sensors by applying, based on the calibration data, a transformation to the data from one or more of the multiple depth sensors.

7. The computer-readable storage medium of claim 1,
wherein the calibration data comprises the image noise characteristics are in the form of one or more of: photon shot noise, photo response non-uniformity (PRNU), thermal noise, dark current or any combination thereof; and
wherein the image noise characteristics are the result of a statistical analysis of variations across images captured by one of the one or more cameras.

8. The computer-readable storage medium of claim 1,
wherein the calibration data comprises the image noise characteristics; and
wherein the process further comprises performing noise reduction based on characterizing one or more types of noise in the 3D conversation data by applying shot noise and/or dark current noise to the depth information.

9. The computer-readable storage medium of claim 1, wherein the 3D representation is one or more of: a point cloud, a signed distance function, populated voxels, a mesh, a light field or any combination thereof.

10. The computer-readable storage medium of claim 1,
wherein the calibration data comprises the second parameters;
wherein the second parameters include one or more of: focal length, a relationship between a pixel coordinates, lens geometric distortion, or any combination thereof;
wherein the second parameters characterize the optical, geometric, and/or digital characteristics of at least one of the one or more cameras; and
wherein the second parameters are used in the transformation to map between camera coordinates and pixel coordinates of one or more images.

11. The computer-readable storage medium of claim 1,
wherein the calibration data comprises the first parameters;
wherein the first parameters include one or more of: the location and orientation of at least one of the one or more cameras, one or more heat values, one or more moisture values, lighting characteristics, or any combination thereof;
wherein the first parameters characterize light received at each of multiple camera pixels; and
wherein the first parameters are used in the transformation to interpret light factors in terms of a 3D environment.

12. The computer-readable storage medium of claim 1, wherein the calibration data comprises one or more of: measurements of camera components, one or more captured images of a pre-defined target, heat data, moisture data, geographic mapping data for the one or more cameras, time-of-flight measurements, lighting conditions, or any combination thereof.

13. A method comprising:
obtaining 3D conversation data comprising color information and depth information;
obtaining calibration data comprising A) first parameters specifying surrounding conditions and/or context detected for one or more cameras that captured the color information and/or depth information and/or B) second parameters specifying intrinsic features of the one or more cameras that captured the color information and/or depth information; and
providing transmission data, based on the 3D conversation data and calibration data, to a reconstruction system that:
transforms, based on the calibration data, a version of the transmission data into a 3D representation;
wherein the 3D representation is rendered into one or more 2D images; and
wherein the one or more 2D images are output by a recipient system engaged in the 3D conversation.

14. The method of claim 13 further comprising:
assigning capture device identifiers to parts of the 3D conversation data according to the device that captured that part of the 3D conversation data, wherein the calibration data is associated with a camera identifier for which the calibration data was generated; and
correlating the calibration data with the at least part of the 3D conversation data based on a match between A) the capture device identifier assigned to the at least part of the 3D conversation data and B) the camera identifier.

15. The method of claim 13, wherein the output of the one or more 2D images includes a wearable projection system projecting light, based on the one or more 2D images, into at least one eye of a user of the recipient system.

16. The method of claim 13, wherein the transforming the version of the transmission data into the 3D representation is performed by X) combining data, captured by multiple sources, from the version of the transmission data and/or Y) determining position and contour information in 3D space for aspects of the transmission data.

17. A computing system comprising:
one or more processors; and
one or more memories storing instructions that, when executed by the one or more processors, cause the computing system to perform a process comprising:

obtaining 3D conversation data comprising color information and depth information;

obtaining calibration data comprising A) first parameters specifying surrounding conditions and/or context detected for one or more cameras that captured the color information and/or depth information and/or B) second parameters specifying intrinsic features of the one or more cameras that captured the color information and/or depth information; and providing transmission data, based on the 3D conversation data and calibration data, to a reconstruction system that:
   transforms, based on the calibration data, a version of the transmission data into a 3D representation;
wherein the 3D representation is rendered into one or more 2D images; and
wherein the one or more 2D images are output by a recipient system engaged in the 3D conversation.

18. The computing system of claim 17, wherein the transforming the version of the transmission data into the 3D representation is performed by X) combining data, captured by multiple sources, from the version of the transmission data and/or Y) determining position and contour information in 3D space for aspects of the transmission data.

19. The computing system of claim 17,
wherein the reconstruction system transforms the version of the transmission data into the 3D representation in part by applying one or more transformations to each pixel, specified in the depth information and that corresponds to a depiction of a user, into a 3D representation of at least part of the user based on the calibration data; and
wherein the one or more transformations generate, for each pixel the one or more transformations are applied to, a point in 3D space, wherein that point in 3D space represents a point on the surface of the user and is determined based on a determined camera location specified in the calibration data.

20. The computing system of claim 17, wherein the reconstruction system applies shading and/or color data onto the 3D representation, using the calibration data to map portions of the color information to the 3D representation.

* * * * *